(12) United States Patent
Oyanagi et al.

(10) Patent No.: US 8,227,539 B2
(45) Date of Patent: Jul. 24, 2012

(54) PHOTOCURABLE INK COMPOSITION AND INKJET RECORDING METHOD

(75) Inventors: Takashi Oyanagi, Matsumoto (JP); Keitaro Nakano, Matsumoto (JP); Masaaki Itano, Matsumoto (JP); Chiyoshige Nakazawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 724 days.

(21) Appl. No.: 12/228,224

(22) Filed: Aug. 11, 2008

(65) Prior Publication Data

US 2009/0208651 A1    Aug. 20, 2009

(30) Foreign Application Priority Data

| Aug. 9, 2007 | (JP) | 2007-208561 |
| Aug. 9, 2007 | (JP) | 2007-208640 |
| Sep. 18, 2007 | (JP) | 2007-240669 |
| Jul. 31, 2008 | (JP) | 2008-197978 |

(51) Int. Cl.
   *C09D 11/10* (2006.01)
   *C08K 3/08* (2006.01)
(52) U.S. Cl. ............ 524/441; 524/437; 522/71; 522/81; 522/180
(58) Field of Classification Search .......... 523/160, 523/161; 522/180, 71, 81; 428/195.1; 106/31.6, 106/31.9; 524/437, 441
   See application file for complete search history.

(56) References Cited

U.S. PATENT DOCUMENTS

| 3,582,487 A | 6/1971 | Fuhr et al. |
| 3,607,693 A | 9/1971 | Heine et al. |
| 3,720,635 A | 3/1973 | Metzner et al. |
| 3,929,693 A | 12/1975 | Hochberg |
| 4,007,144 A | 2/1977 | Sanders et al. |
| 4,190,602 A | 2/1980 | Brunisholz et al. |
| 4,233,195 A | 11/1980 | Mills |
| 4,308,400 A | 12/1981 | Felder et al. |
| 4,315,807 A | 2/1982 | Felder et al. |
| 4,318,791 A | 3/1982 | Felder et al. |
| 4,320,186 A | 3/1982 | Kato et al. |
| 4,321,118 A | 3/1982 | Felder et al. |
| 4,347,111 A | 8/1982 | Gehlhaus et al. |
| 4,370,379 A | 1/1983 | Kato et al. |
| 4,450,279 A | 5/1984 | Shirosaki et al. |
| 4,477,681 A | 10/1984 | Gehlhaus et al. |
| 4,507,466 A | 3/1985 | Tomalia et al. |
| 4,522,693 A | 6/1985 | Henne et al. |
| 4,558,120 A | 12/1985 | Tomalia et al. |
| 4,568,737 A | 2/1986 | Tomalia et al. |

(Continued)

FOREIGN PATENT DOCUMENTS

CN     1398724 A    2/2003

(Continued)

OTHER PUBLICATIONS

Step et al. Macromolecules, 1994, 27, 2529-2539.*

(Continued)

*Primary Examiner* — David W Wu
*Assistant Examiner* — Vu A Nguyen
(74) *Attorney, Agent, or Firm* — Nutter McClennen & Fish LLP; John J. Penny, Jr.

(57) ABSTRACT

A photocurable ink composition includes: a polymerizable compound; a radical photopolymerization initiator; a hindered amine compound; and a metallic pigment, the polymerizable compound including an active hydrogen-containing functional group.

12 Claims, 3 Drawing Sheets

U.S. PATENT DOCUMENTS

| | | | |
|---|---|---|---|
| 4,587,329 A | 5/1986 | Tomalia et al. | |
| 4,631,337 A | 12/1986 | Tomalia et al. | |
| 4,694,064 A | 9/1987 | Tomalia et al. | |
| 4,721,734 A | 1/1988 | Gehlhaus et al. | |
| 4,830,902 A | 5/1989 | Plantenga et al. | |
| 4,922,004 A | 5/1990 | Kohler et al. | |
| 5,041,516 A | 8/1991 | Frechet et al. | |
| 5,077,402 A | 12/1991 | Desobry et al. | |
| 5,212,212 A | 5/1993 | Fonda | |
| 5,453,121 A | 9/1995 | Nicholls et al. | |
| 5,662,738 A | 9/1997 | Schmid et al. | |
| 5,690,723 A | 11/1997 | Sano et al. | |
| 5,846,306 A | 12/1998 | Kubota et al. | |
| 5,903,290 A | 5/1999 | Nicoloff, Jr. et al. | |
| 6,030,441 A | 2/2000 | Kubota et al. | |
| 6,114,404 A | 9/2000 | Deeken et al. | |
| 6,187,897 B1 | 2/2001 | Kawashima et al. | |
| 6,322,188 B1 | 11/2001 | Sano | |
| 6,341,841 B1 | 1/2002 | Shimada et al. | |
| 6,395,079 B1 | 5/2002 | Sano | |
| 6,419,733 B1 | 7/2002 | Sano et al. | |
| 6,444,019 B1 | 9/2002 | Zou et al. | |
| 6,488,751 B1 | 12/2002 | Takemoto | |
| 6,637,850 B2 | 10/2003 | Shimada et al. | |
| 6,846,074 B2 | 1/2005 | Hirai | |
| 6,849,110 B2 | 2/2005 | Sano | |
| 6,869,470 B2 | 3/2005 | Kato | |
| 6,890,049 B2 | 5/2005 | Shimada et al. | |
| 7,156,909 B2 | 1/2007 | Oyanagi et al. | |
| 7,285,592 B2 | 10/2007 | Harz et al. | |
| 7,303,619 B2 | 12/2007 | Oyanagi | |
| 7,384,472 B2 | 6/2008 | Schweikart et al. | |
| 7,438,405 B2 | 10/2008 | Ichizawa et al. | |
| 7,538,144 B2 | 5/2009 | Vanmaele et al. | |
| 7,581,829 B2 | 9/2009 | Oyanagi et al. | |
| 7,591,889 B2 | 9/2009 | Stoffel et al. | |
| 7,604,693 B2 | 10/2009 | Oyanagi et al. | |
| 7,670,418 B2 | 3/2010 | Kato et al. | |
| 7,732,505 B2 | 6/2010 | Kito et al. | |
| 7,828,888 B2 | 11/2010 | Itano et al. | |
| 7,854,798 B2 | 12/2010 | Udagawa et al. | |
| 7,866,807 B2 | 1/2011 | Makuta et al. | |
| 2003/0017353 A1 | 1/2003 | Yamaguchi et al. | |
| 2003/0089271 A1 | 5/2003 | Hirano et al. | |
| 2003/0144377 A1 | 7/2003 | Sano et al. | |
| 2003/0157356 A1 | 8/2003 | Tamura et al. | |
| 2005/0039631 A1 | 2/2005 | Best et al. | |
| 2005/0176841 A1 | 8/2005 | Krohn | |
| 2006/0009546 A1 | 1/2006 | Brown | |
| 2006/0211788 A1 | 9/2006 | Krohn | |
| 2006/0229382 A1 | 10/2006 | Schweikart et al. | |
| 2006/0268084 A1 | 11/2006 | Nishizaki et al. | |
| 2007/0022547 A1 | 2/2007 | O'Brien | |
| 2007/0037961 A1 | 2/2007 | Oyanagi et al. | |
| 2007/0044684 A1 | 3/2007 | Nakano et al. | |
| 2007/0060670 A1 | 3/2007 | Ellis | |
| 2007/0076069 A1 | 4/2007 | Edwards et al. | |
| 2007/0120926 A1 | 5/2007 | Doumaux et al. | |
| 2007/0129457 A1 | 6/2007 | Nakano et al. | |
| 2007/0142501 A1* | 6/2007 | Oyanagi et al. | 523/160 |
| 2007/0148585 A1 | 6/2007 | Kaneko et al. | |
| 2007/0224345 A1 | 9/2007 | Metz et al. | |
| 2007/0249750 A1* | 10/2007 | Oyanagi et al. | 522/84 |
| 2007/0281141 A1 | 12/2007 | Kohlweyer | |
| 2008/0024577 A1 | 1/2008 | Nakano et al. | |
| 2008/0081119 A1 | 4/2008 | Oyanagi et al. | |
| 2008/0090931 A1* | 4/2008 | Nagvekar et al. | 522/114 |
| 2008/0096998 A1 | 4/2008 | Oyanagi et al. | |
| 2008/0145628 A1 | 6/2008 | Oyanagi et al. | |
| 2008/0173214 A1 | 7/2008 | Oyanagi et al. | |
| 2008/0182083 A1 | 7/2008 | Oyanagi et al. | |
| 2008/0182085 A1 | 7/2008 | Oyanagi et al. | |
| 2008/0207805 A1 | 8/2008 | Blease et al. | |
| 2008/0213518 A1 | 9/2008 | Oyanagi et al. | |
| 2008/0250970 A1 | 10/2008 | Oyanagi et al. | |
| 2008/0308004 A1 | 12/2008 | Deroover et al. | |
| 2009/0053415 A1 | 2/2009 | Isobe | |
| 2009/0110827 A1 | 4/2009 | Nakano et al. | |
| 2009/0142555 A1 | 6/2009 | Sano et al. | |
| 2009/0169834 A1 | 7/2009 | Sano et al. | |
| 2009/0214833 A1 | 8/2009 | Oyanagi et al. | |
| 2009/0280265 A1 | 11/2009 | Oyanagi et al. | |
| 2009/0289973 A1 | 11/2009 | Makuta et al. | |
| 2011/0014440 A1 | 1/2011 | Itano et al. | |
| 2011/0036266 A1 | 2/2011 | Oyanagi et al. | |

FOREIGN PATENT DOCUMENTS

| | | |
|---|---|---|
| CN | 1529740 A | 9/2004 |
| CN | 1721462 A | 1/2006 |
| CN | 1771307 A | 5/2006 |
| EP | 0040721 A2 | 6/1981 |
| EP | 0042567 A2 | 6/1981 |
| EP | 0192167 A1 | 11/1986 |
| EP | 0284561 A2 | 9/1988 |
| EP | 0372778 A1 | 6/1990 |
| EP | 00400721 A2 | 12/1990 |
| EP | 1045013 A1 | 10/2000 |
| EP | 1422072 A1 | 5/2004 |
| EP | 1862511 A1 | 12/2007 |
| EP | 1892105 A1 | 2/2008 |
| EP | 1942157 A2 | 7/2008 |
| EP | 1942158 A2 | 7/2008 |
| EP | 1947151 A1 | 7/2008 |
| EP | 1950260 A1 | 7/2008 |
| GB | 1276369 A | 6/1972 |
| GB | 1 547 283 A | 6/1979 |
| GB | 2172655 A | 9/1986 |
| GB | 2367299 A | 4/2002 |
| JP | 47-3981 B | 2/1972 |
| JP | 47-6416 B | 2/1972 |
| JP | 47-22326 B | 6/1972 |
| JP | 47-23664 B | 7/1972 |
| JP | 57-30704 A | 2/1982 |
| JP | 59-42864 B2 | 10/1984 |
| JP | 60-26403 B2 | 6/1985 |
| JP | 60-26483 B2 | 6/1985 |
| JP | 61-194062 A | 8/1986 |
| JP | 62001426 A | 1/1987 |
| JP | 62-81345 A | 4/1987 |
| JP | 63-61950 B2 | 11/1988 |
| JP | 1-34242 B2 | 7/1989 |
| JP | 2-9596 B2 | 3/1990 |
| JP | 2-9597 B2 | 3/1990 |
| JP | 2-211452 A | 8/1990 |
| JP | 3033093 B | 2/1991 |
| JP | 0356573 A | 3/1991 |
| JP | 0379678 A | 4/1991 |
| JP | 2867369 B | 7/1991 |
| JP | 03160068 A | 7/1991 |
| JP | 04018462 A | 1/1992 |
| JP | 10120956 A | 5/1998 |
| JP | 11165420 A | 6/1999 |
| JP | 11193316 A | 7/1999 |
| JP | 11-343436 A | 12/1999 |
| JP | 2000044861 A | 2/2000 |
| JP | 2000345080 A | 12/2000 |
| JP | 2002-179960 A | 6/2002 |
| JP | 2003292836 A | 10/2003 |
| JP | 2003-342499 A | 12/2003 |
| JP | 2004-009360 A | 1/2004 |
| JP | 2004009359 A | 1/2004 |
| JP | 2004009796 A | 4/2004 |
| JP | 2004195797 A | 7/2004 |
| JP | 2004197055 A | 7/2004 |
| JP | 2004-264435 A | 9/2004 |
| JP | 2005008690 A | 1/2005 |
| JP | 2005015813 A | 1/2005 |
| JP | 2005023284 A | 1/2005 |
| JP | 2005068250 A | 3/2005 |
| JP | 2005068251 A | 3/2005 |
| JP | 2005187659 A | 7/2005 |
| JP | 2005-350551 A | 12/2005 |
| JP | 2006-117931 A | 5/2006 |
| JP | 2006137183 A | 6/2006 |
| JP | 2006176734 A | 7/2006 |
| JP | 2006-241194 A | 9/2006 |
| JP | 2006265524 A | 10/2006 |

| | | | |
|---|---|---|---|
| JP | 2006283017 A | 10/2006 |
| JP | 2006312711 A | 11/2006 |
| JP | 2007-045990 A | 2/2007 |
| JP | 2007046034 A | 2/2007 |
| JP | 2007131741 A | 5/2007 |
| JP | 2007-138084 A | 6/2007 |
| JP | 2007138084 A | 6/2007 |
| JP | 2007-169451 A | 7/2007 |
| JP | 2007-182535 A | 7/2007 |
| JP | 2007169451 A | 7/2007 |
| JP | 2007182536 A | 7/2007 |
| JP | 2007191613 B1 | 7/2007 |
| JP | 2007-191613 A | 8/2007 |
| JP | 2007-269017 A | 10/2007 |
| JP | 2008-075067 A | 4/2008 |
| JP | 2008075067 A | 4/2008 |
| JP | 2008-138045 A | 6/2008 |
| JP | 2008138045 A | 6/2008 |
| WO | 9905230 A | 2/1999 |
| WO | 02055619 A1 | 7/2002 |
| WO | 200561566 A1 | 7/2005 |
| WO | 2006041004 A1 | 4/2006 |
| WO | 20061085992 A2 | 8/2006 |
| WO | 2006101054 A1 | 9/2006 |
| WO | 2006112031 A1 | 10/2006 |
| WO | 2007060264 A2 | 5/2007 |

OTHER PUBLICATIONS

Hawker, C.J. and Frechet, J. M.J., "Preparation of Polymers with Controlled Molecular Architecture. A New Convergent Approach to Dendritic Macromolecules," Journal of the American Chemical Society, vol. 112 (1990), pp. 7638 to 7647.

Kim, Y. H., "Highly Branched Aromatic Polymers Prepared by Single Step Synthesis," Macromol. Symp. 77, 21 (1994).

Hawker, C.J. et al., "Hyperbranched Poly(ethylene glycol)s: A New Class of Ion-Conducting Materials," Macromolecules, vol. 29 (1996), pp. 3831 to 3838.

Eaton, D.F., "One-Electron Oxidation of Benzyltrialkylstannanes. 1. Cation Radical Fragmentation by Dual Modes," JACS, vol. 102, (1980), pp. 3278-3281.

Davidson, R. S., "The Chemistry of Photoinitiators-Some Recent Developments," Journal of Photochemistry and Biology A: Chemistry, 73. 81 (1993).

Fouassier, J. P., "Photoinitiated Polymerization—Theory and Applications," Rapra Review Reports, vol. 9, No. 4, Rapra Technology, (1998).

Tsunooka, M. et al., "Photoacid and Photobase Generators: Chemistry and Applications to Polymeric Materials," Prog. Polym. Sci., vol. 21, No. 1, (1996), pp. 1-45.

"Organic Material for Imaging", edited by the Japanese Research Association for Organic Electronics Materials, Bunshin Design Printing Publishing and Digital Communications (1993), pp. 187 to 192.

Saeva, F.D., "Photoinduced Electron Transfer (PET) Bond Cleavage Reactions," Topics in Current Chemistry, vol. 156, No. 59, (1990), pp. 58-92.

Fouassier, J.P. and Rabek, J.F., "Radiation Curing in Polymer Science and Technology," vol. 1, (1993), pp. 77-117, Elsevier Science Publishers Ltd., England.

Chatterjee, S., et al, "Photochemistry of Carbocyanine Alkyltriphenylborate Salts: Intra-Ion-Pair Electron Transfer and the Chemistry of Boranyl Radicals," JACS, vol. 112, (1990), pp. 6329-6338.

International Search Report from Related International Application No. PCT/JP2008/064126. (3 pages).

Monroe, B. M. et al., "Photoinitiators for Free-Radical-Initiated Photoimaging Systems," Chemical Revue, 93, 435 (1993).

Maslak, P. "Fragmentations by Photoinduced Electron Transfer," Topics in Current Chemistry, vol. 168, No. 1, (1993), pp. 1-46.

U.S. Non-final Office Action for U.S. Appl. No. 12/228,193, mailed Jun. 2, 2011.

U.S. Final Office Action for U.S. Appl. No. 12/228,193, mailed Oct. 14, 2011.

U.S. Non-Final Office Action for U.S. Appl. No. 12/894,423 issued Nov. 10, 2011.

Extended European Search Report issued Dec. 28, 2008 in connection with European Application No. 08016440.

Extended European Search Report issued Nov. 2, 2011 for Application No. 11177753.8 (6 pages).

U.S. Office Action issued Dec. 21, 2011 for U.S. Appl. No. 12/074,308 (16 pages).

U.S. Office Action for U.S. Appl. No. 12/228,193, mailed Mar. 8, 2012 (8 pages).

U.S. Office Action issued Jan. 6, 2012 for U.S. Appl. No. 13/197,174 (8 pages).

U.S. Office Action issued Dec. 12, 2011 for U.S. Appl. No. 13/240,667 (14 pages).

\* cited by examiner

PHOTOCURABLE INK COMPOSITION AND INKJET RECORDING METHOD

Japanese Patent Application No. 2007-208561, filed on Aug. 9, 2007, Japanese Patent Application No. 2007-208640, filed on Aug. 9, 2007, Japanese Patent Application No. 2007-240669, filed on Sep. 18, 2007, and Japanese Patent Application No. 2008-197978, filed on Jul. 31, 2008, are hereby incorporated by reference in their entirety.

BACKGROUND OF THE INVENTION

The present invention relates to a photocurable ink composition and an inkjet recording method.

Various ink compositions that are cured by applying activation energy rays such as light have been developed. Such ink compositions are required to exhibit storage stability and curability. Specifically, it is necessary that the ink composition does not polymerize when activation energy rays are not applied during storage, but is polymerized and cured quickly and sufficiently when activation energy rays are applied. However, technology has not yet been developed that can provide an ink composition with both the above characteristics.

For example, JP-A-2006-241194 discloses an ink composition that contains a polymerizable compound, a pigment, a polymer having a nitrogen-containing heterocyclic ring, and a polymerization initiator. In JP-A-2006-241194, a polymer in which a hydroquinone or HALS (hindered amine compound) group is introduced or the like is added to the ink composition as a heat polymerization inhibitor. JP-A-2006-241194 describes that the ink composition exhibits good storage stability and curability upon application of activation energy rays. JP-A-2006-241194 describes that the polymer having a nitrogen-containing heterocyclic ring traps radicals generated in the ink composition due to a dark reaction which suppresses an increase in viscosity (polymerization) during storage.

As described above, a heat polymerization inhibitor may be added to an ink composition in order to suppress generation of radicals due to a dark reaction in order to impart storage stability. However, since a hydroquinone-type heat polymerization inhibitor is consumed during the process of inactivating radicals, the effect does not last for a long time. Since a hindered amine-type heat polymerization inhibitor without an oxidation-reduction cycle is also consumed in the same manner as a hydroquinone-type heat polymerization inhibitor, the effect does not last for a long time. Therefore, a large amount of heat polymerization inhibitor is added to an activation energy ray-curable ink composition. As a result, the effect of inactivating radicals may increase during the photocuring reaction, whereby the curability of the ink composition may be impaired.

Polymerization of a radically polymerizable photocurable ink composition is generally inhibited by oxygen in the air. An amine compound may be added to suppress such a phenomenon. In this case, the amine compound is denatured so that the resulting cured film becomes yellow.

In an example of an attempt to provide an ink composition with both storage stability and curability, JP-A-2003-342499 discloses an activation ray-curable ink composition that contains a polyene compound and a polythiol compound. However, since the photocurable ink composition disclosed in JP-A-2003-342499 is polymerized only via an ene-thiol reaction, the polymerization rate is low. Moreover, the ene-thiol reaction causes a dark reaction which tends to result in gelation tends and a deterioration in storage stability.

There is an increasing for printed articles having a metallic gloss surface formed on the print side. A printed article having a metallic gloss surface has been obtained by a foil stamping printing method that provides a recording medium having a highly flat print side and prints an image on the recording medium using metal foil, a method using vacuum deposition to deposit a metal on a plastic film having a flat print side under vacuum, a method that applies a metallic pigment ink to a recording medium and presses the resulting product, or the like.

A metallic gloss surface with excellent properties may be easily formed by utilizing a metallic pigment for the above-mentioned photocurable ink. However, when adding a metallic pigment to a known photocurable ink, the curability of the coating becomes insufficient so that an excellent metallic gloss surface cannot be obtained. For example, when using a metallic pigment as the pigment in a photocurable ink, light applied to the ink coating is absorbed and reflected by the metallic pigment so that the coating may be cured insufficiently due to a decrease in the quantity of light. When intense light is applied in order to ensure curing of the coating, heat is generated due to light absorbed by the metallic pigment, whereby a recording medium or the like may be damaged. Moreover, such intense light may give rise to safety problems (e.g., light is scattered due to reflection).

SUMMARY

According to a first aspect of the invention, there is provided a photocurable ink composition comprising: a polymerizable compound; a radical photopolymerization initiator; a hindered amine compound; and a metallic pigment, the polymerizable compound including an active hydrogen-containing functional group.

According to a second aspect of the invention, there is provided a photocurable ink composition comprising: a polymerizable compound; a radical photopolymerization initiator; a chain transfer agent; a hindered amine compound; and a metallic pigment, the chain transfer agent including an active hydrogen-containing functional group.

According to a third aspect of the invention, there is provided an inkjet recording method of discharging droplets of an ink composition to a recording medium so that the droplets adhere to the recording medium, the method comprising: generating an image having metallic gloss by using any of the above-described photocurable ink compositions.

DETAILED DESCRIPTION OF THE EMBODIMENT

Figure 1:
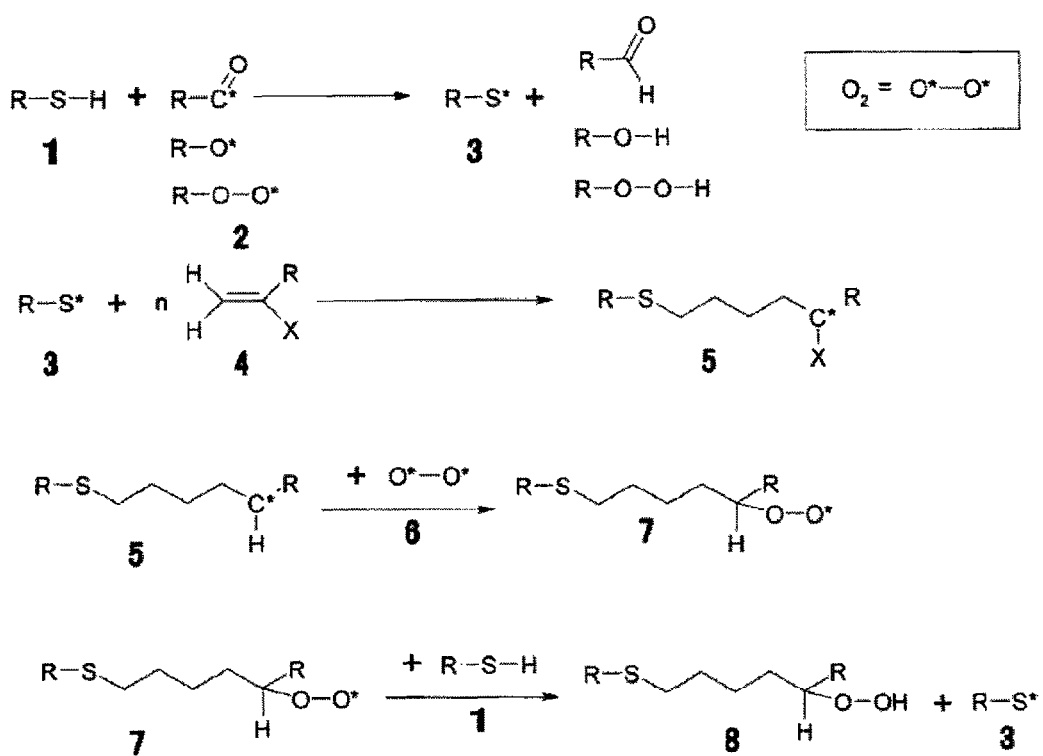
FIG. 1 schematically shows a chain transfer reaction.

The invention may provide a photocurable ink composition that exhibits excellent storage stability, excellent curing sensitivity, a high polymerization rate, and excellent curability.

The invention may provide a photocurable ink composition that exhibits curability, can form a metallic image or an underlayer concealing image, and exhibits excellent storage stability.

According to one embodiment of the invention, there is provided a photocurable ink composition comprising: a polymerizable compound; a radical photopolymerization initiator; a hindered amine compound; and a metallic pigment, the polymerizable compound including an active hydrogen-containing functional group.

The above photocurable ink composition exhibits excellent storage stability, excellent curing sensitivity, a high polymerization rate, and excellent curability.

The above photocurable ink composition exhibits excellent storage stability and can form a metallic image with excellent curability and a concealing image with excellent underlayer concealability.

In the photocurable ink composition according to this embodiment, the active hydrogen-containing functional group may be at least one group selected from an amino group, an imino group, and an alcohol hydroxyl group.

In the photocurable ink composition according to this embodiment, the polymerizable compound may include an unsaturated double bond.

In the photocurable ink composition according to this embodiment, the unsaturated double bond may be an unsaturated double bond of at least one of a vinyl group and an allyl group.

According to one embodiment of the invention, there is provided a photocurable ink composition comprising: a polymerizable compound; a radical photopolymerization initiator; a chain transfer agent; a hindered amine compound; and a metallic pigment, the chain transfer agent including an active hydrogen-containing functional group.

The above photocurable ink composition exhibits excellent storage stability, excellent curing sensitivity, a high polymerization rate, and excellent curability.

The above photocurable ink composition exhibits excellent storage stability and can form a metallic image with excellent curability and a concealing image with excellent underlayer concealability.

In the photocurable ink composition according to this embodiment, the chain transfer agent may be a thiol compound.

The photocurable ink composition according to this embodiment may further comprise a compound including an active hydrogen-containing functional group as the polymerizable compound.

In the photocurable ink composition according to this embodiment, the compound including an active hydrogen-containing functional group may include a vinyl group or an allyl group.

The photocurable ink composition according to this embodiment may further comprise a compound including an acrylic group or a methacrylic group as the polymerizable compound.

In the photocurable ink composition according to this embodiment, the hindered amine compound may have a 2,2,6,6-tetramethylpiperidine structure.

In the photocurable ink composition according to this embodiment, the metallic pigment may be aluminum or an aluminum alloy.

In the photocurable ink composition according to this embodiment, the metallic pigment may be prepared by pulverizing a metal deposited film.

In the photocurable ink composition according to this embodiment, the metallic pigment may be plate-like particles; and when a major axis, a minor axis, and a thickness of each of the plate-like particles in a plane are respectively referred to as X, Y, and Z, a circle-equivalent 50% average particle diameter of each of the plate-like particles may be determined based on the X-Y plane area and in a range from 0.5 to 3 micrometers.

In the photocurable ink composition according to this embodiment, the metallic pigment may have a light transmittance of 0.4% or more.

According to one embodiment of the invention, there is provided an inkjet recording method of discharging droplets of an ink composition to a recording medium so that the droplets adhere to the recording medium, the method comprising: generating an image having metallic gloss by using any of the above-described photocurable ink compositions.

The photocurable ink composition according to the above embodiment that includes the hindered amine compound and the polymerizable compound including active hydrogen allows an oxidation-reduction cycle to be easily formed with respect to the hindered amine compound, the photocurable ink composition exhibits excellent storage stability and excellent curability due to the function of the polymerizable compound including active hydrogen.

The photocurable ink composition according to the above embodiment that includes the hindered amine compound and the chain transfer agent including active hydrogen allows an oxidation-reduction cycle and a chain transfer reaction to proceed in the composition, the photocurable ink composition is rarely affected by oxygen inhibition to exhibit excellent curability.

Figure 2:
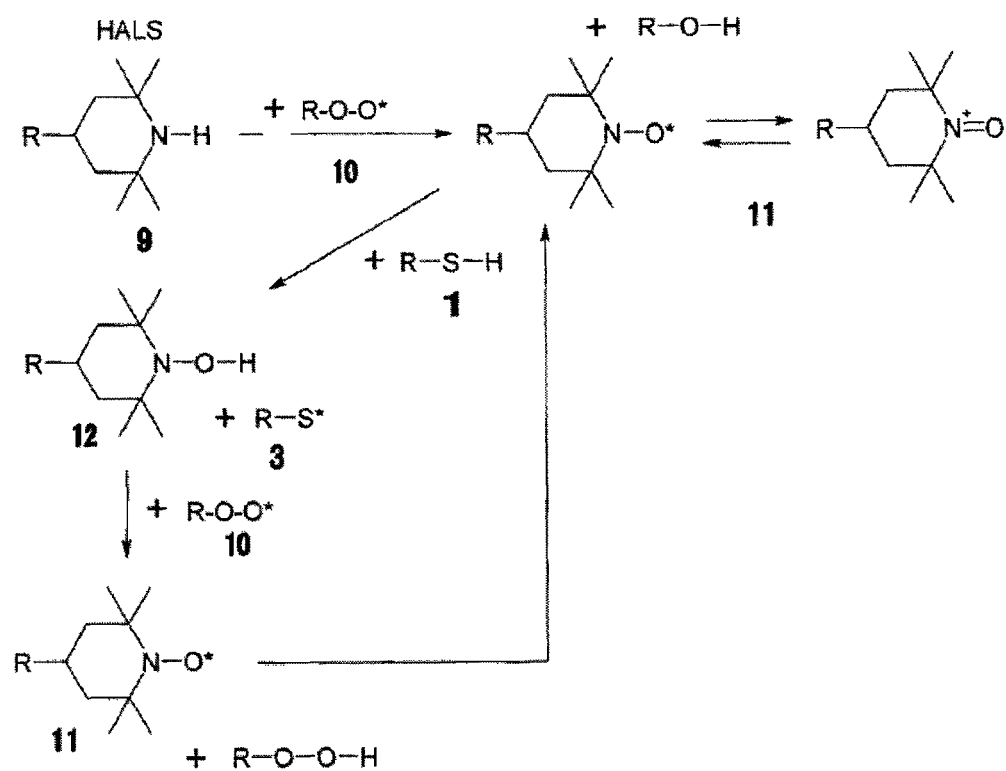
FIG. 2 schematically shows the oxidation-reduction cycle of a hindered amine compound.
Figure 3:
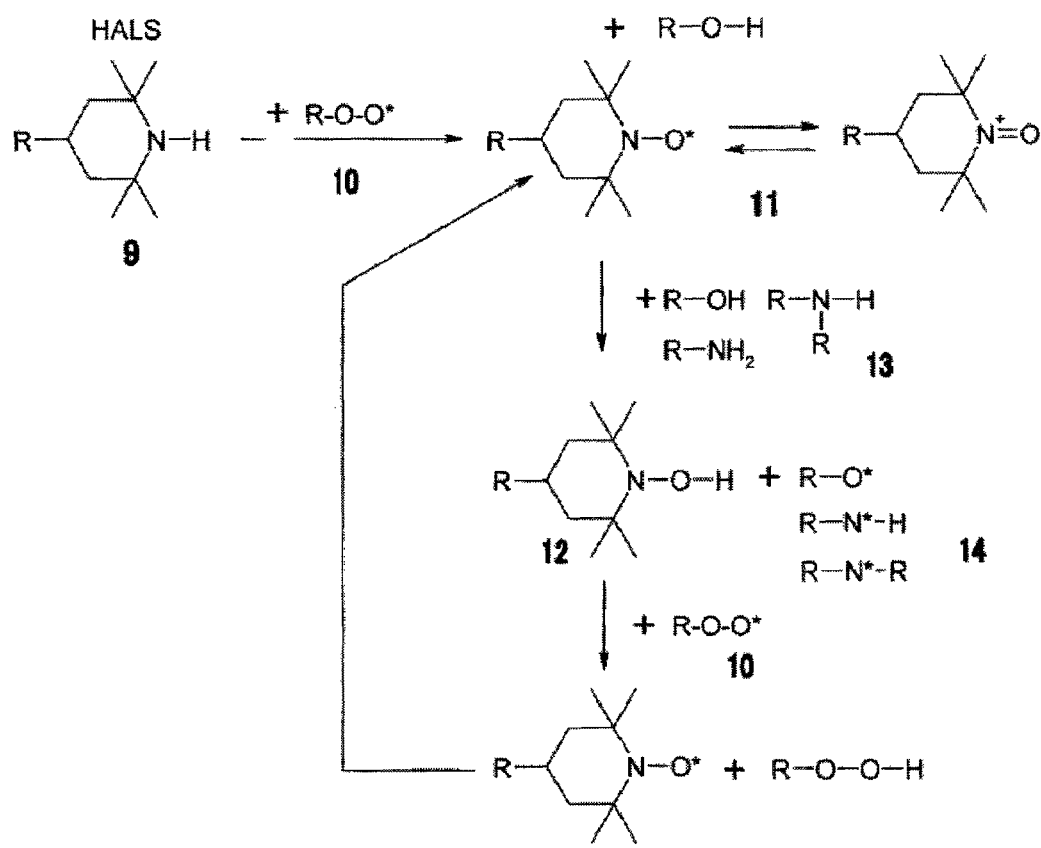
FIG. 3 schematically shows the oxidation-reduction cycle of a hindered amine compound when a large number of active hydrogen compounds are present in a system.

The reasons therefor are described below with reference to reaction schemes shown in FIGS. 1 to 3. Suppression of oxygen inhibition is described below with reference to FIG. 1. A thiol (1) having active hydrogen and an initiator-derived radical (2) produce a thiyl radical (3) due to stimulation by light or the like. The thiyl radical (3) reacts with an unsaturated double bond compound (4) to produce a carbon radical (5). The carbon radical (5) reacts with oxygen (6) (undergoes oxygen inhibition) to produce a peroxy radical (7). The radical polymerization reaction stops in this stage. However, when the thiol (1) having active hydrogen is present, a chain transfer reaction occurs so that the thiol (1) reacts with the peroxy radical (7) to produce the thiyl radical (3). Therefore, a radical reaction with the unsaturated double bond compound (4) then proceeds. As described above, when the thiol (1) having active hydrogen is present in the system, a chain transfer reaction occurs so that oxygen inhibition during polymerization is suppressed. As a result, polymerization can proceed without being terminated.

A reaction when a hindered amine compound and a compound having active hydrogen are present in a radical polymerization reaction system is described below with reference to FIG. 2. When a hindered amine (9) is present when a reaction is terminated due to oxygen inhibition after a peroxy radical (10) has been produced, the hindered amine (9) reacts with the peroxy radical (10) to produce a nitro radical (11). This reaction occurs as a result of the radical trapping effect of the hindered amine compound on the peroxy radical. The nitro radical (11) reacts with a compound (13) having active hydrogen to produce a radical (14) derived from the active hydrogen compound. A polymerization reaction proceeds due to this radical. An oxime (12) reacts with the peroxy radical (10) to produce the nitro radical (11). As described above, when the compound having active hydrogen and the hindered amine compound are present in the system, oxygen inhibition during polymerization is suppressed. As a result, polymerization can proceed without being terminated.

A reaction when a hindered amine compound and a chain transfer agent are present in a radical polymerization reaction system is described below with reference to FIG. 3. In this case, when a reaction is terminated due to oxygen inhibition after the peroxy radical (10) has been produced, the hindered amine (9) reacts with the peroxy radical (10) to produce the nitro radical (11). The nitro radical (11) reacts with the thiol (1) having active hydrogen to produce the oxime (12). The oxime (12) reacts with the peroxy radical (10) to produce the nitro radical (11). In this case, since the thiyl radical (3) is produced, a radical reaction proceeds. As described above, when the chain transfer agent having active hydrogen and the hindered amine compound are present in the system, oxygen inhibition during polymerization is suppressed. As a result, polymerization can proceed without being terminated.

According to the above embodiment, a radical polymerization reaction can be allowed to proceed by suppressing termination of a reaction due to oxygen inhibition while ensuring that the hindered amine compound exhibits its radical polymerization inhibition capability. Therefore, the photocurable ink composition according to the above embodiment exhibits excellent storage stability, excellent curing sensitivity, a high polymerization rate, and excellent curability. An ink that contains a metallic pigment exhibits excellent curability. The photocurable ink composition according to the above embodiment exhibits excellent storage stability and can form a metallic image with excellent curability and a concealing image with excellent underlayer concealability.

According to the above embodiment, an inkjet recording method capable of forming an excellent image, a recorded article, an ink set, an ink cartridge, and an inkjet recording device using the photocurable ink composition that exhibits excellent storage stability and curability are provided.

Preferred embodiments of the invention are described in detail below.

1. First Embodiment 1.1. Photocurable Ink Composition

A photocurable ink composition according to one embodiment of the invention includes a polymerizable compound, a radical photopolymerization initiator, a hindered amine compound, and a metallic pigment.

The photocurable ink composition according to this embodiment having the above configuration exhibits excellent storage stability, does not undergo oxygen inhibition, and shows an improved curing sensitivity and polymerization rate. The photocurable ink composition according to this embodiment having the above configuration exhibits excellent storage stability and excellent curability and can form a metallic image or a concealing image.

1.1.1. Polymerizable Compound

The photocurable ink composition according to this embodiment includes the polymerizable compound. The polymerizable compound includes an active hydrogen-containing functional group.

The polymerizable compound is classified as a radically polymerizable compound, a cationically polymerizable compound, or a radically and cationically polymerizable compound. Any of these polymerizable compounds can be suitably used for the photocurable ink composition according to this embodiment.

In this embodiment, the polymerizable compound including an active hydrogen-containing functional group allows an oxidation-reduction reaction to proceed smoothly in cooperation with the hindered amine compound.

The term "active hydrogen" used herein refers to a hydrogen atom that has relatively high reactivity and is produced from an amino group, an imino group, an amide group, a hydroxyl group, a carboxyl group, an alcohol hydroxyl group, or the like.

The active hydrogen-containing functional group included in the polymerizable compound is preferably at least one group selected from an amino group, an imino group, and an alcohol hydroxyl group from the viewpoint of reducing the ink viscosity.

Specific examples of the polymerizable compound including the active hydrogen-containing functional group include N-vinylformamide, a urethane oligomer, ethylene glycol monoallyl ether, diethylene glycol monoallyl ether, trimethylolpropane diallyl ether, trimethylolpropane monoallyl ether, glycerol monoallyl ether, allyl glycidyl ether, pentaerythritol triallyl ether, hydroxybutyl vinyl ether, 2-hydroxyethyl methacrylate, 2-hydroxypropyl acrylate, 4-hydroxybutyl acrylate, and the like.

Examples of the urethane oligomer include commercially available products such as U-4HA and U-15HA (manufactured by Shin-Nakamura Chemical Co., Ltd.).

The polymerizable compound may include an unsaturated double bond in addition to the active hydrogen-containing functional group. Examples of the unsaturated double bond that may be included in the polymerizable compound include the unsaturated double bond of a vinyl group ($CH_2=CH-R$), the unsaturated double bond of an acrylic group ($CH_2=CH-COOR$) or a methacrylic group ($CH_2=CCH_3-COOR$), the unsaturated double bond of an acryloyl group ($CH_2=CH-CO-R$) or a methacryloyl group ($CH_2=CCH_3-CO-R$), the unsaturated double bond of an allyl group ($R-CH_2CH=CH_2$), the unsaturated double bond of an allyl ether group ($R-O-CH_2CH=CH_2$), and the like.

Examples of the polymerizable compound that includes the active hydrogen-containing functional group and an unsaturated double bond include ethylene glycol monoallyl ether, allyl glycol (available from Nippon Nyukazai Co., Ltd., for example), trimethylolpropane diallyl ether, pentaerythritol triallyl ether, glycerol monoallyl ether, diethylene glycol monoallyl ether (available from Daiso Co., Ltd., for example), allyl group-containing polyoxyalkylene compounds ("Uniox", "Unilub", "Polycerin", and "Unisafe" available from NOF Corporation), a dendritic polymer including the active hydrogen-containing functional group and a (meth)acryloyl group, a urethane oligomer, and the like.

The photocurable ink composition according to this embodiment may include a compound including an acrylic group or a methacrylic group and a compound including a vinyl group or an allyl group in combination. This makes it possible to achieve a high polymerization rate.

The polymerizable compound that includes the active hydrogen-containing functional group and an unsaturated double bond used in the photocurable ink composition according to this embodiment is preferably at least one of the dendritic polymer including the active hydrogen-containing functional group and a (meth)acryloyl group and a urethane oligomer from the viewpoint of curability.

The photocurable ink composition may include a plurality of the above-mentioned polymerizable compounds including the active hydrogen-containing functional group.

The photocurable ink composition according to this embodiment may include the polymerizable compound including the active hydrogen-containing functional group and a polymerizable compound that does not include active hydrogen. Examples of the polymerizable compound that does not include active hydrogen include tripropylene glycol diacrylate and a dendritic polymer including a (meth)acryloyl group (e.g., "Viscoat #1000" (manufactured by Osaka Organic Chemical Industry Ltd.)).

Examples of a monofunctional monomer used as the polymerizable compound that does not include active hydrogen include phenoxyethyl acrylate, isobornyl acrylate, methoxydiethylene glycol monoacrylate, acryloylmorpholine, lauryl methacrylate, cyclohexyl methacrylate, oxetane methacrylate, and the like.

Examples of a bifunctional monomer used as the polymerizable compound that does not include active hydrogen include ethylene glycol dimethacrylate, diethylene glycol diacrylate, diethylene glycol dimethacrylate, tripropylene glycol diacrylate, 1,9-nonanediol diacrylate, polyethylene glycol #400 diacrylate, tetraethylene glycol dimethacrylate, 1,6-hexanediol diacrylate, 1,6-hexanediol dimethacrylate, neopentyl glycol diacrylate, neopentyl glycol dimethacrylate, 1,4-butanediol dimethacrylate, and the like.

Examples of a polyfunctional monomer used as the polymerizable compound that does not include active hydrogen include trimethylolpropane triacrylate, trimethylolpropane trimethacrylate, trimethylolpropane EO-adduct triacrylate, trimethylolpropane PO-adduct triacrylate, glycerol EO-adduct triacrylate, glycerol PO-adduct triacrylate, dipentaerythritol hexaacrylate, dipentaerythritol polyacrylate, a dendritic polymer including an acryloyl group, and the like.

Further examples of the polymerizable compound that does not include active hydrogen include general-purpose radically polymerizable compounds. Examples of the radically polymerizable compounds include a cyclic olefin, a linear olefin, a conjugated diene, a vinyl compound, an allyl compound, and the like. Among these, the vinyl compound or the allyl compound is preferable from the viewpoint of storage stability and a reduction in ink viscosity, with an allyl ether compound being more preferable.

Examples of the cyclic olefin include cyclohexene, cyclooctene, and the like. The term "cyclic olefin" used herein refers to a cyclic compound of which the ring is formed of carbon or a carbon multiple bond.

Examples of the linear olefin include alkenes.

Examples of the conjugated diene include 1,2-pentadiene, 1,4-hexadiene, and the like.

Examples of the vinyl compound include N-vinyl compounds, vinyl ethers, and the like. Specific examples of the vinyl compound include N-vinylcaprolactam, methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexyl methyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, phenoxypolyethylene glycol vinyl ether, divinyl ethers such as ethylene glycol divinyl ether, diethylene glycol divinyl ether, triethylene glycol divinyl ether, polyethylene glycol divinyl ether, propylene glycol divinyl ether, butylene glycol divinyl ether, hexanediol divinyl ether, bisphenol A alkylene oxide divinyl ether, and bisphenol F alkylene oxide divinyl ether, polyfunctional vinyl ethers such as trimethylolethane trivinyl ether, trimethylolpropane trivinyl ether, ditrimethylolpropane tetravinyl ether, glycerol trivinyl ether, pentaerythritol tetravinyl ether, dipentaerythritol pentavinyl ether, dipentaerythritol hexavinyl ether, ethoxylated trimethylolpropane trivinyl ether, propoxylated trimethylolpropane trivinyl ether, ethoxylated ditrimethylolpropane tetravinyl ether, propoxylated ditrimethylolpropane tetravinyl ether, ethoxylated pentaerythritol tetravinyl ether, propoxylated pentaerythritol tetravinyl ether, ethoxylated dipentaerythritol hexavinyl ether, and propoxylated dipentaerythritol hexavinyl ether, and the like.

Examples of the allyl compound include ethylene glycol monoallyl ether, trimethylolpropane triallyl ether, diethylene glycol diallyl ether, pentaerythritol tetraallyl ether, glycerol triallyl ether, and the like.

The dendritic polymer is classified as a dendritic polymer that includes the active hydrogen-containing functional group or a dendritic polymer that does not include the active hydrogen-containing functional group. In this embodiment, a dendritic polymer that includes the active hydrogen-containing functional group may be used as the polymerizable compound that includes the active hydrogen-containing functional group. In this embodiment, a dendritic polymer that does not include the active hydrogen-containing functional group may be used as the polymerizable compound that does not include the active hydrogen-containing functional group, as required.

The dendritic polymers are roughly classified into the following six structures (see "Dendritic Polymer—Functionalization Using Multi-Branched Structure", general editors: Keigo Aoi and Masaaki Kakimoto, NTS Inc.).

I Dendrimer
II Linear dendritic polymer
III Dendrigraft polymer
IV Hyperbranched polymer
V Star-hyperbranched polymer
VI Hypergraft polymer The dendrimer I, the linear dendritic polymer II, and the dendrigraft polymer III have a degree of branching (DB) with a value of 1 (i.e., a structure without defects), and the hyperbranched polymer IV, the star-hyperbranched polymer V, and the hypergraft polymer VI have a randomly branched structure that may have defects. In particular, since reactive functional groups can be densely concentrated on the outer surface of the dendrimer as compared with generally-used linear polymers, the dendrimer is expected to be a functional polymer material. It is also possible to introduce a large number of reactive functional groups into the outer surface of the hyperbranched polymer, the dendrigraft polymer, or the hypergraft polymer, though not to the extent of the dendrimer. Therefore, the hyperbranched polymer, the dendrigraft polymer, and the hypergraft polymer exhibit excellent curability.

These dendritic polymers are highly branched and have branched structures which are repeated three-dimensionally, differing from known linear polymers and branched polymers. Therefore, the viscosity of the dendritic polymer can be reduced as compared with a linear polymer having the same molecular weight as that of the dendritic polymer.

Examples of a method of synthesizing the dendrimer that may be used in this embodiment include a divergent method that synthesizes the dendrimer from the core toward the periphery and a convergent method that synthesizes the dendrimer from the periphery toward the core.

In this embodiment, when using the dendrimer, the hyperbranched polymer, the dendrigraft polymer, or the hypergraft polymer, it is preferable to use a dendrimer, a hyperbranched polymer, a dendrigraft polymer, or a hypergraft polymer that is solid at room temperature and has an average molecular weight of 1000 to 100,000, and preferably 2000 to 50,000.

When the dendrimer, the hyperbranched polymer, the dendrigraft polymer, or the hypergraft polymer is not solid at room temperature, an image formed using the resulting photocurable ink composition may not be maintained. If the molecular weight is lower than the above-mentioned range, the resulting image may become fragile. If the molecular weight is higher than the above-mentioned range, the viscosity of the resulting ink increases to a large extent even if the added amount is reduced which is impractical from the point of flight properties.

In this embodiment, when using the dendrimer, the hyperbranched polymer, the dendrigraft polymer, or the hypergraft polymer, it is preferable that the dendrimer, the hyperbranched polymer, the dendrigraft polymer, or the hypergraft polymer have radically polymerizable functional groups on the outermost surface. A polymerization reaction can be caused to proceed quickly by utilizing a structure having radically polymerizable functional groups on the outermost surface.

Examples of a polymer having a dendrimer structure include amidoamine dendrimers (U.S. Pat. No. 4,507,466, U.S. Pat. No. 4,558,120, U.S. Pat. No. 4,568,737, U.S. Pat. No. 4,587,329, U.S. Pat. No. 4,631,337, and U.S. Pat. No. 4,694,064), phenyl ether dendrimers (U.S. Pat. No. 5,041,516 and Journal of the American Chemical Society, vol. 112 (1990, pages 7638 to 7647)), and the like. As the amidoamine dendrimer, a dendrimer having a terminal amino group and a methyl carboxylate group is commercially available as "Starburst (registered trademark) (PAMAM)" (manufactured by Aldrich). The terminal amino group of this amidoamine dendrimer may be reacted with an acrylic acid derivative or a methacrylic acid derivative to synthesize an amidoamine dendrimer having a corresponding terminal. The resulting amidoamine dendrimer may be used in this embodiment.

Examples of the acrylic acid derivative or the methacrylic acid derivative reacted with the terminal amino group of this amidoamine dendrimer include, but are not limited to, alkyl acrylates and alkyl methacrylates such as methyl acrylate, methyl methacrylate, ethyl acrylate, ethyl methacrylate, n-butyl acrylate, n-butyl methacrylate, t-butyl acrylate, t-butyl methacrylate, cyclohexyl acrylate, cyclohexyl methacrylate, palmityl acrylate, palmityl methacrylate, stearyl acrylate, and stearyl methacrylate, acrylic acid amide, and acrylic acid alkylamides and methacrylic acid alkylamides such as acrylic acid isopropylamide and acrylic acid isopropylamide.

Various phenyl ether dendrimers are disclosed in the above-mentioned Journal of the American Chemical Society, vol. 112 (1990, pages 7638 to 7647). For example, 3,5-dihydroxybenzyl alcohol is reacted with 3,5-diphenoxybenzyl bromide to synthesize a second-generation benzyl alcohol. The OH group of the benzyl alcohol is converted into Br using $CBr_4$ and triphenyl phosphine. The resulting product is reacted with 3,5-dihydroxybenzyl alcohol to synthesize the next-generation benzyl alcohol. The above-mentioned reactions are repeated to synthesize the desired dendrimer. The terminal of the phenyl ether dendrimer may be replaced by groups having various chemical structures instead of allowing the terminal benzyl ether bond to remain. For example, when using an alkyl halide instead of benzyl bromide when synthesizing the dendrimer disclosed in Journal of the American Chemical Society, vol. 112, a phenyl ether dendrimer having a terminal structure having the corresponding alkyl group is obtained. It is also possible to use a polyamine dendrimer (Macromol. Symp. 77, 21 (1994)) or a derivative obtained by modifying the terminal group of the polyamine dendrimer.

As the hyperbranched polymer, hyperbranched polyethylene glycol or the like may be used. The hyperbranched polymer is obtained by synthesizing the target polymer in one stage using a monomer that has two or more reaction sites corresponding to branches and one reaction site corresponding to a joint in one molecule (Macromolecules, vol. 29 (1996), pages 3831 to 3838). For example, a 3,5-dihydroxybenzoic acid derivative may be used as the monomer for synthesizing the hyperbranched polymer. The hyperbranched polymer is produced as follows, for example. Methyl 3,5-bis[8'-hydroxy-3',6'-dioxaoctyl)oxy]benzoate (i.e., a hydrolyzate of methyl 3,5-bis[[8'-(t-butyldiphenylsiloxy)-3',6'-dioxaoctyl]oxy]benzoate obtained from 1-bromo-8-(t-butyldiphenylsiloxy)-3,6-dioxaoctane and methyl 3,5-dihydroxybenzoate) is heated in a nitrogen atmosphere in the presence of dibutyltin diacetate to synthesize poly[bis(triethylene glycol)benzoate] (i.e., hyperbranched polymer).

When using 3,5-dihydroxybenzoic acid, the hyperbranched polymer has a hydroxyl group at its terminal. Therefore, hyperbranched polymers having various terminal groups can be synthesized by reacting an appropriate alkyl halide with the hydroxyl group.

The characteristics of a monodispersed polymer having a dendrimer structure, a hyperbranched polymer, and the like are determined by the chemical structure of the main chain and the chemical structure of the terminal group. In particular, the characteristics of a monodispersed polymer having a dendrimer structure, a hyperbranched polymer, and the like differ to a large extent depending on differences in terminal groups and substitution groups in the chemical structure. In particular, a polymer having a terminal polymerizable group shows a high gelation effect after a photoreaction due to its reactivity. A dendrimer having a polymerizable group is obtained by chemically modifying the terminal of a dendrimer having a terminal basic atomic group (e.g., amino group, substituted amino group, or hydroxyl group) with a compound having a polymerizable group.

For example, a dendrimer having a polymerizable group is synthesized by adding an isocyanate group-containing vinyl compound to a polyfunctional compound obtained by adding an active hydrogen-containing (meth)acrylate compound to an amino dendrimer via a Michael reaction. A dendrimer having a terminal polymerizable group is obtained by reacting (meth)acrylic chloride or the like with an amino dendrimer, for example. Examples of the vinyl compound that produces such a polymerizable group include compounds having a radically polymerizable ethylenically unsaturated bond. Examples of the compounds having a radically polymerizable ethylenically unsaturated bond include various compounds having a radically polymerizable ethylenically unsaturated bond such as unsaturated carboxylic acids (e.g., acrylic acid, methacrylic acid, itaconic acid, crotonic acid, isocrotonic acid, and maleic acid) and salts thereof.

Further examples of the polymerizable group include terminal groups having a cationically polymerizable group. Such a cationically polymerizable group may be introduced by reacting the amino dendrimer with a cyclic ether compound (e.g., oxirane or oxetane) having a polymerizable group that undergoes polymerization via cationic polymerization of an epoxy group or an oxetanyl group, an alicyclic polyepoxide, a polyglycidyl ester of a polybasic acid, or a polyglycidyl ether of a polyhydric alcohol. For example, an epoxy-type cationically polymerizable group may be introduced into the terminal of the amino dendrimer by reacting chloromethyloxirane with the amino dendrimer. The terminal group may be a cationically polymerizable group selected from styrene derivatives, vinylnaphthalene derivatives, vinyl ethers, N-vinyl compounds, and the like.

In this embodiment, the dendrimer, the hyperbranched polymer, the dendrigraft polymer, and the hypergraft polymer may be used either individually or in combination with other dendrimers, hyperbranched polymers, dendrigraft polymers, and hypergraft polymers.

Examples of a commercially available dendritic polymer having a (meth)acryloyl group include "Viscoat #1000" (manufactured by Osaka Organic Chemical Industry Ltd.) and the like. Viscoat #1000 is a hyperbranched polymer obtained by branching functional groups from dipentaerythritol as a core. Viscoat #1000 does not include the active hydrogen-containing functional group, but includes an acryloyl group on the outermost surface. Therefore, Viscoat #1000 can be suitably used.

The content of the polymerizable compound in the photocurable ink composition according to this embodiment is preferably 10 to 90 mass %, and more preferably 25 to 75 mass %.

1.1.2. Radical Photopolymerization Initiator

The photocurable ink composition according to this embodiment includes the radical photopolymerization initiator. As the radical photopolymerization initiator, a compound having sensitivity to activation rays to be applied such as ultraviolet rays, deep ultraviolet rays, g-line, h-line, i-line, KrF excimer laser light, ArF excimer laser light, electron beams, X-rays, molecular beams, or ion beams may be appropriately selected.

Radical photopolymerization initiators known in the art may be used without limitations. Specific examples of the radical photopolymerization initiator are disclosed in Bruce M. Monroe et al., Chemical Review, 93, 435 (1993), R. S. Davidson, Journal of Photochemistry and Biology A: Chemistry, 73. 81 (1993), J. P. Faussier, "Photoinitiated Polymerization—Theory and Applications": Rapra Review vol. 9, Report, Rapra Technology (1998), and M. Tsunooka et al., Prog. Polym. Sci., 21, 1 (1996). Compounds utilized for chemically-amplified photoresists and cationic photopolymerization are disclosed in "Organic Material for Imaging", edited by the Japanese Research Association for Organic Electronics Materials, Bunshin Design Printing Publishing and Digital Communications (1993), pages 187 to 192. Compounds that undergo oxidative or reductive bond cleavage through interaction with the electron excited state of a sensitizing dye are disclosed in F. D. Saeva, Topics in Current Chemistry, 156, 59 (1990), G. G. Maslak, Topics in Current Chemistry, 168, 1 (1993), H. B. Shuster et al, JACS, 112, 6329 (1990), and I. D. F. Eatonetal, JACS, 102, 3298 (1980).

Examples of the radical photopolymerization initiator preferably used in this embodiment include (a) an aromatic ketone, (b) an aromatic onium salt compound, (c) an organic peroxide, (d) a hexaarylbiimidazole compound, (e) a ketoxime ester compound, (f) a borate compound, (g) an azinium compound, (h) a metallocene compound, (i) an active ester compound, (j) a compound having a carbon-halogen bond, and the like.

Preferable examples of the aromatic ketone (a) include compounds having a benzophenone skeleton or a thioxanethone skeleton disclosed in Radiation Curing in Polymer Science and Technology, J. P. Fouassier and J. F. Rabek (1993), pages 77 to 117, and the like.

More preferable examples of the aromatic ketone (a) include an alpha-thiobenzophenone compound disclosed in JP-B-47-6416, a benzoin ether compound disclosed in JP-B-47-3981, an alpha-substituted benzoin compound disclosed in JP-B-47-22326, a benzoin derivative disclosed in JP-B-47-23664, an aroyl phosphonate disclosed in JP-A-57-30704, a dialkoxybenzophenone disclosed in JP-B-60-26483, a benzoin ether disclosed in JP-B-60-26403 and JP-A-62-81345, an alpha-aminobenzophenone disclosed in JP-B-1-34242, U.S. Pat. No. 4,318,791, and European Patent No. 0284561 A1, p-di(methylaminobenzoyl)benzene disclosed in JP-A-2-211452, a thio-substituted aromatic ketone disclosed in JP-A-61-194062, an acylphosphine sulfide disclosed in JP-B-2-9597, an acylphosphine disclosed in JP-B-2-9596, a thioxanethone disclosed in JP-B-63-61950, a coumarin disclosed in JP-B59-42864, and the like.

Radical photopolymerization initiators available as Vicure 10, 30 (manufactured by Stauffer Chemical), Irgacure 127, 184, 2959, 907, 369, 379, 754, 1700, 1800, 1850, 1870, 819, OXE01, OXE02, Darocur 1173, TPO, ITX (manufactured by Ciba Specialty Chemicals), Quantacure CTX (manufactured by Aceto Chemical), Kayacure DETX-S (manufactured by Nippon Kayaku Co., Ltd.), and ESACURE KIP150 (manufactured by Lamberti) may also be used.

The above-mentioned radical photopolymerization initiators may be used in combination.

The content of the radical photopolymerization initiator in the photocurable ink composition according to this embodiment is preferably 1 to 20 mass %, and more preferably 2 to 10 mass %.

1.1.3. Hindered Amine Compound

The photocurable ink composition according to this embodiment includes the hindered amine compound. Examples of the hindered amine compound include a compound having a 2,2,6,6-tetramethylpiperidine group in the structure, benzotriazole compounds, triazine compounds, tetrapiperidine compounds, and the like.

Specific examples of the hindered amine compound include
2-(2H-benzotriazol-2-yl)-4,6-bis(1-methyl-1phenylethyl) phenol ($C_{30}H_{29}N_3O$),
2-(2H-benzotriazol-2-yl)-6-dodecyl-4-methylphenol ($C_{25}H_{35}N_3O$),
bis(1-octyloxy-2,2,6,6-tetramethyl-4-piperidyl)sebacate (C44H84N2O6),
bis(2,2,6,6-tetramethyl-4-piperidyl)sebacate ($C_{28}H_{52}N_2O_4$),
bis(octadecyl)hydroxylamine ($[CH_3(CH_2)_{17}]_2NOH$), 2-(4,6-diphenyl-1,3,5-triazin-2-yl)-5-[(hexyl)oxy]-phenol ($C_{27}H_{27}N_3O_2$),
poly(4-hydroxy-2,2,6,6-tetramethyl-1-piperidineethanol-alt-1,4-butanedioicacid) (average Mn: <3500, average Mn 3100 to 4000) (($C_{15}H_{29}NO_6)_n$),
poly {[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]} (average Mn: <2000) (($C_{35}H_{68}N_8)_n$),
1,5,8,12-tetrakis [4,6-bis(N-butyl-N-1,2,2,6,6-pentamethyl-4-piperidylamino)-1,3,5-triazin-2-yl]-1,5,8,12-tetraazadodecane ($C_{132}H_{250}N_{32}$), and the like.

The hindered amine compound used in the photocurable ink composition according to this embodiment is preferably the compound having a 2,2,6,6-tetramethylpiperidine group in the structure from the viewpoint of a storage stability improvement effect due to inhibition of thermal polymerization. Specific examples of such a compound include a 2,2,6,6-tetramethylpiperidinoxy free radical, bis(1-octyloxy-2,2,6,6-tetramethyl-4-piperidyl)sebacate, and the like. A commercially available product such as Irgastab UV-10 (manufactured by Ciba Specialty Chemicals) may also be used.

The content of the hindered amine compound in the photocurable ink composition is preferably 0.01 to 1.0 mass %, and more preferably 0.05 to 0.5 mass %.

1.1.4. Metallic Pigment

The photocurable ink composition according to this embodiment includes the metallic pigment. The metallic pigment used in the photocurable ink composition according to this embodiment provides metallic gloss to a recording medium or the like to which the photocurable ink composition is applied.

An arbitrary metallic pigment may be used insofar as the metallic pigment can provide a metallic gloss when applied. Examples of the metallic pigment include particles of silver, gold, platinum, nickel, chromium, tin, zinc, indium, titanium, copper, and the like. At least one metallic pigment selected from these elements, alloys of these elements, and a mixture of these elements may be used.

The metallic pigment used by the this embodiment is preferably aluminum or an aluminum alloy from the viewpoint of excellent metallic gloss and cost. When using an aluminum alloy, a metal element or a nonmetallic element added to aluminum is not particularly limited insofar as the element exhibits metallic gloss. Examples of such an element include silver, gold, platinum, nickel, chromium, tin, zinc, indium, titanium, copper, and the like. At least one element selected from these elements, alloys of these elements, and a mixture of these elements may be used.

The content of the metallic pigment in the photocurable ink composition according to this embodiment is preferably 0.5 to 3.0 mass %.

It is preferable that the metallic pigment be plate-like particles. When using such a metallic pigment, the metallic pigment particles allow light to be applied (transmitted) to the photocurable ink composition when curing the photocurable ink composition. Therefore, a highly cured print side can be more easily formed.

The term "plate-like particle" used herein refers to a particle that has an approximately flat surface (X-Y plane) and an approximately uniform thickness. When the metallic pigment is prepared by fracturing a metal deposited film, the resulting particles have an approximately flat surface and an approximately uniform thickness. Therefore, the major axis, the minor axis, and the thickness of the plate-like particles in a plane can be defined as X, Y, and Z.

When using plate-like particles as the metallic pigment, when the major axis, the minor axis, and the thickness of the plate-like particles in a plane are respectively referred to as X, Y, and Z, the plate-like particles preferably have a circle-equivalent 50% average particle diameter R50 determined based on the X-Y plane area of the plate-like particles of 0.5 to 3 micrometers. The 50% average particle diameter R50 is more preferably 0.75 to 2 micrometers. If the 50% average particle diameter R50 is less than 0.5 micrometers, an image with insufficient metallic gloss may be formed. If the 50% average particle diameter R50 is more than 3 micrometers, print stability may deteriorate. It is preferable that the relationship between the circle-equivalent 50% average particle diameter R50 and the thickness Z satisfies R50/Z>5. If the relationship between the circle-equivalent 50% average particle diameter R50 and the thickness Z satisfies R50/Z>5, an image with excellent metallic gloss can be formed. If the ratio R50/Z is five or less, an image with insufficient metallic gloss may be formed.

The term "circle equivalent diameter" used herein refers to the diameter of a circle when the approximately flat surface (X-Y plane) of the plate-like particles is a circle having the same projection area as that of the plate-like particles. For example, when the approximately flat surface (X-Y plane) of the plate-like particles is a polygon, the diameter of a circle obtained by converting the plane of projection of the polygon into a circle is referred to as the circle equivalent diameter of the plate-like particles.

The term "circle-equivalent 50% average particle diameter R50 of the plate-like particles" used herein refers to a circle equivalent diameter corresponding to 50% of the total number of particles measured when drawing the distribution of the number (frequency) of particles with respect to the circle equivalent diameter.

The metallic pigment formed of the plate-like particles may be produced as follows, for example. A complex pigment raw material having a structure in which a release resin layer and a metal or metal compound layer are sequentially laminated on the surface of a sheet-like substrate is provided. The metal or metal compound layer is removed from the sheet-like substrate at the interface between the metal or metal compound layer and the release resin layer, and is then ground to obtain plate-like particles.

The metal or metal compound layer is preferably formed by vacuum deposition, ion plating, or sputtering.

The thickness of the metal or metal compound layer is preferably 20 to 100 nm. A metallic pigment having an average thickness of 20 to 100 nm is thus obtained. If the average thickness of the metallic pigment is 20 nm or more, the metallic pigment exhibits excellent reflectivity and gloss. If the average thickness of the metallic pigment is 100 nm or less, an increase in apparent specific gravity is suppressed so that the dispersion stability of the metallic pigment can be ensured.

The release resin layer used for the complex pigment raw material is an undercoat layer for the metal or metal compound layer. The release resin layer serves as a releasable layer that improves the releasability of the metal or metal compound layer from the surface of the sheet-like substrate. As the resin used for the release resin layer, polyvinyl alcohol, polyvinyl butyral, polyethylene glycol, polyacrylic acid, polyacrylamide, a cellulose derivative, polyvinyl butyral, an acrylic polymer, or a modified nylon resin is preferable, for example.

A solution of the above-mentioned resin or a mixture of two or more of the above-mentioned resins is applied to the sheet-like substrate and dried to obtain a release resin layer. An additive such as a viscosity controller may be added the applied solution.

The release resin layer may be formed by gravure coating, roll coating, blade coating, extrusion coating, dip coating, spin coating, or the like. After application and drying the solution, the surface of the resulting release resin layer may be smoothed by calendering, if necessary.

The thickness of the release resin layer is preferably 0.5 to 50 micrometers, and more preferably 1 to 10 micrometers, although the thickness of the release resin layer is not particularly limited. If the thickness of the release resin layer is less than 0.5 micrometers, the amount of dispersion resin may be insufficient. If the thickness of the release resin layer is more than 50 micrometers, the release resin layer may be easily removed from the pigment layer at the interface when rolled.

The sheet-like substrate is not particularly limited. Examples of the sheet-like substrate include releasable films such as a polyester film formed of polytetrafluoroethylene, polyethylene, polypropylene, polyethylene terephthalate, or the like, a polyamide film formed of nylon 66, nylon 6, or the like, a polycarbonate film, a triacetate film, and a polyimide film. Among these, polyethylene terephthalate or a copolymer thereof is preferable.

The thickness of the sheet-like substrate is preferably 10 to 150 micrometers, although the thickness of the sheet-like substrate is not particularly limited. If the thickness of the sheet-like substrate is 10 micrometers or more, excellent handling properties are achieved. If the thickness of the sheet-like substrate is 150 micrometers or less, the sheet-like substrate is flexible so that the sheet-like substrate can be easily rolled and removed, for example. The metal or metal compound layer may be provided with a protective layer. Examples of the protective layer include a silicon oxide layer and a protective resin layer.

The silicon oxide layer is not particularly limited insofar as the silicon oxide layer contains silicon oxide. For example, the silicon oxide layer is preferably formed by a sol-gel method using a silicon alkoxide (e.g., tetraalkoxysilane) or its polymer. A solution prepared by dissolving a silicon alkoxide or its polymer in an alcohol is applied and fired to form a silicon oxide layer coating.

The protective resin layer is not particularly limited insofar as the protective resin layer is formed of a resin that is not dissolved in a dispersion medium. Examples of such a resin include polyvinyl alcohol, polyethylene glycol, polyacrylic acid, polyacrylamide, a cellulose derivative, and the like. The protective resin layer is preferably formed of polyvinyl alcohol or a cellulose derivative.

An aqueous solution of the above-mentioned resin or a mixture of two or more of the above-mentioned resins is applied and dried to form a protective resin layer. An additive such as a viscosity controller may be added the coating solution. The silicon oxide layer or the protective resin layer is formed in the same manner as the release resin layer.

The thickness of the protective layer is preferably 50 to 150 micrometers, although the thickness of the protective layer is not particularly limited. If the thickness of the protective layer is less than 50 nm, the protective layer may exhibit insufficient mechanical strength. If the thickness of the protective layer is more than 150 nm, it may be difficult to pulverize and disperse the protective layer due to an increase in strength. Moreover, the protective layer may be removed from the metal or metal compound layer at the interface between the protective layer and the metal or metal compound layer.

The complex pigment raw material may have a layer configuration that includes a plurality of stacked structures formed of the release resin layer and the metal or metal compound layer. The total thickness of the stacked structure of a plurality of metal or metal compound layers (i.e., the thickness of metal or metal compound layer-release resin layer-metal or metal compound layer or release resin layer-metal or metal compound layer excluding the sheet-like substrate and the release resin layer directly formed on the sheet-like substrate) is preferably 5000 nm or less. If the total thickness of the stacked structure of a plurality of metal or metal compound layers is 5000 nm or less, cracks or separation rarely occurs even if the complex pigment raw material is rolled (i.e., excellent storage stability is obtained). Moreover, the resulting pigment exhibits excellent gloss.

A structure in which the release resin layer and the metal or metal compound layer are stacked on each side of the sheet-like substrate may also be employed, for example.

The metal or metal compound layer is preferably removed from the sheet-like substrate by immersing the complex pigment raw material in a liquid, or immersing the complex pigment raw material in a liquid while applying ultrasonic waves and to pulverize the removed complex pigment raw material, for example.

A stable liquid dispersion can be obtained by merely dispersing the metallic pigment formed of the plate-like particles thus obtained in a solvent, since the release resin layer serves as a protective colloid. When using the metallic pigment for the photocurable ink composition according to this embodiment, the resin contained in the release resin layer provides adhesion to a recording medium (e.g., paper). The metallic pigment produced by the above-described method can be characterized by the properties of a metal deposited film formed during the production. Specifically, the light transmittance of the metal deposited film formed during the production of the metallic pigment can be easily measured. It is considered that a metallic pigment obtained by pulverizing the metal deposited film has the same light transmittance as that of the metal deposited film. The light transmittance of the metal deposited film may be measured using a UW integration actinometer "C9536" or "H9535" (manufactured by Hamamatsu Photonics Ltd.) or a UV radiometer "UM-10" (manufactured by Konica Minolta Holdings, Inc.), for example.

It is preferable that the metal particles prepared by pulverizing the metal deposited film have a light transmittance (particularly a transmittance of light having a wavelength of about 350 to 450 nm used for curing) in the direction of the thickness the metal deposited film of 0.4% or more in order to reduce the quantity of light required to cure a print side formed on a recording medium.

1.1.5. Other Components 1.1.5.1. Color Material

A coloring agent that may be normally used for an ink may be used for the photocurable ink composition according to this embodiment without specific limitations. Examples of the coloring agent include a pigment and a dye. In this embodiment, it is advantageous to use a pigment from the viewpoint of the durability of a printed article.

As the dye used in this embodiment, various dyes normally used for inkjet recording, such as a direct dye, an acidic dye, a food dye, a basic dye, a reactive dye, a disperse dye, a vat dye, a soluble vat dye, and a reactive disperse dye, may be used.

As the pigment used in this embodiment, an inorganic dye or an organic pigment may be used without specific limitations.

As the inorganic dye, titanium oxide, iron oxide, or carbon black produced by a contact method, a furnace method, a thermal method, or the like may be used. As the organic pigment, an azo pigment (e.g., azo lake, insoluble azo pigment, condensed azo pigment, and chelate azo pigment), a polycyclic pigment (e.g., phthalocyanine pigment, perylene pigment, perynone pigment, anthraquinone pigment, quinacridone pigment, dioxazine pigment, thioindigo pigment, isoindolinone pigment, and quinofuraron pigment), a dye chelate (e.g., basic dye chelate and acidic dye chelate), a nitro pigment, a nitroso pigment, aniline black, or the like may be used.

Specific examples of the pigment are given below. Examples of the carbon black include C. I. Pigment Black 7 (hereinafter may be abbreviated as "PBk7"), No. 2300, No. 900, MCF88, No. 33, No. 40, No. 45, No. 52, MA7, MA8, MA100, No. 2200B (manufactured by Mitsubishi Chemical Corp.), Raven 5750, Raven 5250, Raven 5000, Raven 3500, Raven 1255, Raven 700 (manufactured by Colombia), Regal 400R, Regal 330R, Regal 660R, Mogul L, Mogul 700, Monarch 800, Monarch 880, Monarch 900, Monarch 1000, Monarch 1100, Monarch 1300, Monarch 1400 (manufactured by Cabot), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 (manufactured by Degussa), and the like.

Examples of a yellow pigment include C. I. Pigment Yellow 1, 2, 3, 12, 13, 14, 16, 17, 73, 74, 75, 83, 93, 95, 97, 98, 109, 110, 114, 120, 128, 129, 138, 150, 151, 154, 180, 213 (hereinafter may be abbreviated as "PY213"), and the like.

Examples of a magenta pigment include C. I. Pigment Red 5, 7, 12, 48 (Ca), 48 (Mn), 57 (Ca), 57:1, 112, 122, 123, 184, 202, 209, C. I. Pigment Violet 19 (hereinafter may be abbreviated as "PV19"), and the like.

Examples of a cyan pigment include C. I. Pigment Blue 1, 2, 3, 15:3 (hereinafter may be abbreviated as "PB15:3"), 15:4, 60, 16, 22, and the like.

Examples of a white pigment include C. I. Pigment White 6 (hereinafter may be abbreviated as "PW6") and the like.

When using the pigment in this embodiment, it is preferable to use a pigment having an average particle diameter of 10 to 200 nm, and preferably about 50 to 150 nm.

When using the color material for the photocurable ink composition according to this embodiment, the content of the color material is preferably 0.1 to 25 mass %, and more preferably 0.5 to 15 mass %.

When using the pigment in this embodiment, a pigment dispersion obtained by dispersing the pigment in a medium using a dispersant or a surfactant may be used. As the dispersant, a dispersant (e.g., polymer dispersant) normally used to prepare a pigment dispersion may be preferably used.

When the photocurable ink composition according to this embodiment includes the color material, the photocurable ink composition may include a plurality of color materials corresponding to the respective colors. For example, in addition to four basic colors (yellow, magenta, cyan, black), a deep color or a light color corresponding to each color may be added. Specifically, light magenta (light color) and red (deep color) may be added in addition to magenta, light cyan (light color) and blue (deep color) may be added in addition to cyan, and gray (light color), light black (light color), and mat black (deep color) may be added in addition to black.

The photocurable ink composition according to this embodiment may include a special color pigment in addition to the above-mentioned pigment. Examples of the special color pigment include a fluorescent brightening agent.

1.1.5.2. Additive

Other preferable additives that may be added to the photocurable ink composition according to this embodiment are given below.

The photocurable ink composition according to this embodiment may include a nonionic surfactant as an additive. The permeability of the ink composition in a recording medium is improved by adding the nonionic surfactant so that the photocurable ink composition can be quickly fixed on a recording medium during printing.

Examples of the nonionic surfactant that may be used in this embodiment include, but are not limited to, acetylenic glycol surfactants. Examples of the acetylenic glycol surfactant include BYK-UV3570, BYK-UV3500, BYK-UV3510, BYK-347, BYK-348 (manufactured by BYK Japan KK), and the like. It is preferable to add at least one surfactant selected from these surfactants to the ink composition according to this embodiment.

When using the nonionic surfactant in this embodiment, the nonionic surfactant is preferably added to the photocurable ink composition in an amount of 0.1 to 5 mass %, and more preferably 0.2 to 2 mass %. If the nonionic surfactant is added to the photocurable ink composition in an amount of 0.1 mass % or more, the permeability of the photocurable ink composition in a recording medium can be increased. If the nonionic surfactant is added to the photocurable ink composition in an amount of 5 mass % or less, an image formed on a recording medium using the photocurable ink composition is rarely blurred.

The photocurable ink composition according to this embodiment is prepared using components appropriately selected from the above-mentioned components. It is preferable that the resulting photocurable ink composition have a viscosity of less than 20 mPa·s at 20° C. In this embodiment, it is preferable that the ink composition have a surface tension of 45 mN/m or less, and particularly preferably 25 to 45 mN/m. A photocurable ink composition having characteristics suitable for an inkjet recording method can be obtained by thus adjusting the viscosity and the surface tension of the photocurable ink composition. The viscosity and the surface tension of the photocurable ink composition can be adjusted by appropriately selecting a solvent included in the ink composition, adjusting the amounts of additives, and selecting the types of additives, for example.

1.2. Preparation of Photocurable Ink Composition

A method of preparing the photocurable ink composition according to this embodiment is not particularly limited. For example, the components of the photocurable ink composition are sufficiently mixed and uniformly dissolved. The solution is filtered under pressure through a membrane filter having a pore diameter of 0.8 micrometers. The resulting solution is then degassed using a vacuum pump to prepare a photocurable ink composition.

1.3. Process of Curing Photocurable Ink Composition

The photocurable ink composition according to this embodiment may be cured by applying light. As the light, light that can cause the radical photopolymerization initiator used for the photocurable ink composition to generate radicals is used. The light mentioned in "1.1.1. Radical photopolymerization initiator" is used. It is preferable to use ultraviolet rays having a wavelength of 350 to 450 nm from the viewpoint of simplification of a device and safety. In this case, it is preferable to select a radical photopolymerization initiator that readily generates radicals due to application of light having a wavelength of 350 to 450 nm.

Examples of a light source include a metal halide lamp, a xenon lamp, a carbon-arc lamp, a chemical lamp, a low-pressure mercury lamp, a high-pressure mercury lamp, and the like. A commercially available lamp such as an H lamp, a D lamp, and a V lamp (manufactured by Fusion System) may be used as the light source. A UV-emitting semiconductor element such as a UV light-emitting diode (UV LED) or UV-emitting semiconductor laser may also be used as the light source.

Light is preferably applied to cure the photocurable ink composition at a dose of 10 to 20000 $mJ/cm^2$, and more preferably 50 to 15,000 $mJ/cm^2$, with respect to the plane in which the photocurable ink composition is applied.

1.4. Ink Set

The photocurable ink composition according to this embodiment may be applied to an ink set, for example. The ink set is a set of ink compositions including the photocurable ink composition described in "1. Photocurable ink composition". The ink set may include a known ink composition in addition to the photocurable ink composition. Examples of such an ink composition include a color ink composition (e.g., cyan, magenta, yellow, light cyan, light magenta, dark yellow, red, green, blue, orange, or violet), a colorless or pale clear ink composition, a black ink composition, a light black ink composition, a metallic pigment ink composition, a white pigment ink composition, and the like.

The photocurable ink composition may be used as an ink cartridge that integrally or independently contains one or more ink sets. This facilitates handling and the like. The ink cartridge that includes the ink composition is known in the art. The ink cartridge can be obtained appropriately using a known method.

1.5. Ink Cartridge

The photocurable ink composition according to this embodiment may be applied to an ink cartridge, for example. The ink cartridge may include the ink set described in "1.4. Ink set". The above-described ink set can be easily transported using the ink cartridge. The ink cartridge using the photocurable ink composition according to this embodiment may be used for writing materials, recorders, pen plotters, and the like. The ink cartridge according to this embodiment may be suitably used for an inkjet recording method.

1.6. Inkjet Recording Method

An inkjet recording method according to this embodiment includes discharging droplets of the above-described photocurable ink composition to a recording medium so that the droplets adhere to the recording medium, an image being formed using the photocurable ink composition.

Since the inkjet recording method according to this embodiment uses the above-described photocurable ink composition, printing with excellent photocurability can be performed.

The inkjet recording method according to this embodiment includes an arbitrary recording method that discharges droplets of the photocurable ink composition through a thin nozzle so that the droplets adhere to a recording medium. Specific examples of the inkjet recording method that can use the photocurable ink composition according to this embodiment are given below.

A first method is an electrostatic attraction method. The electrostatic attraction method is a method that applies a strong electric field between a nozzle and an accelerating electrode placed forward of the nozzle to successively discharge droplets of an ink from the nozzle, and supplies a printing information signal to deflection electrodes while the ink droplets travels between the deflection electrodes so that the ink droplets are discharged to a recording medium to record an image, or a method that discharges ink droplets to a recording medium according to the printing information signal without deflecting the ink droplets to record an image on the recording medium. The photocurable ink composition according to this embodiment may be used for a recording method utilizing the electrostatic attraction method.

A second method is a method that discharges ink droplets from a nozzle by applying a pressure to a liquid ink using a small pump and mechanically vibrating the inkjet nozzle using a crystal vibrator or the like. The ink droplets discharged from the nozzle are charged, and discharged to a recording medium by applying a printing information signal to deflection electrodes while the ink droplets travels between the deflection electrodes to record an image on the recording medium. The photocurable ink composition according to this embodiment may be used for this recording method.

A third method is a method that applies a pressure and a printing information signal to a liquid ink using a piezoelectric element to discharge ink droplets to a recording medium from a nozzle to record an image on the recording medium. The photocurable ink composition according to this embodiment may be used for this recording method. The ink set or the ink cartridge according to this embodiment may be suitably used for this recording method.

A fourth method is a method that causes a liquid ink to be foamed with heating using a micro-electrode according to a printing information signal, and discharges the liquid ink to a recording medium from a nozzle by expanding the foam to record an image on the recording medium. The photocurable ink composition according to this embodiment may be used for this recording method.

Each of the above-described methods may be applied to the inkjet recording method according to this embodiment. It is preferable to discharge the photocurable ink composition without heating from the viewpoint for high-speed printing. Specifically, it is preferable to apply the first method, the second method, or the third method.

As an inkjet recording device used for the third method, an inkjet recording device that includes an inkjet recording head, a main body, a tray, a head drive mechanism, and a carriage may be used, for example. The inkjet recording head may include cyan, magenta, yellow, and black ink cartridges so that full-color printing can be achieved, for example. When using this device in this embodiment, at least one ink cartridge is filled with the photocurable ink composition according to this embodiment and provided in the device. The inkjet recording device may include a dedicated control board and the like so that the ink discharge timing of the inkjet recording head and scan of the head drive mechanism can be controlled.

The photocurable ink composition can be discharged and allowed to adhere to a recording medium by utilizing such an inkjet recording device so that an image can be easily printed.

An ultraviolet irradiation device for applying ultraviolet rays may be provided on the side surface of the carriage provided in the inkjet recording device. A UV-emitting semiconductor element such as a UW light-emitting diode (UV LED) or UV-emitting semiconductor laser may also be used as the light source. Ultraviolet rays from the light source can be applied to a recording medium or droplets that adhere to the recording medium in the inkjet recording device.

1.7. Recorded Article

The photocurable ink composition according to this embodiment may be applied to a recorded article, for example. Information is recorded on the recorded article using the above-described recording method. The recording medium is not particularly limited. Examples of the recording medium include an absorbent recording medium such as paper, a film, or cloth, a non-absorbent recording medium such as a metal, glass, or plastic, and the like. The recording medium may be colorless and transparent, translucent, colored and transparent, chromatic and opaque, achromatic and opaque, or the like. The recorded article recorded using the ink composition according to this embodiment exhibits excellent curability.

1.8. Effects

The photocurable ink composition according to this embodiment includes the polymerizable compound including the active hydrogen-containing functional group and the hindered amine compound. Therefore, a radical polymerization reaction can be allowed to proceed by suppressing termination of a reaction due to oxygen inhibition while ensuring that the hindered amine compound exhibits its radical polymerization inhibition capability. Accordingly, the photocurable ink composition according to this embodiment exhibits excellent storage stability due to inhibition of a dark reaction, and exhibits excellent curing sensitivity, polymerization rate, and curability during photocuring. Since the photocurable ink composition according to this embodiment includes the above-described metallic pigment, the photocurable ink composition exhibits excellent storage stability and can form a metallic image with excellent curability and a concealing image with excellent underlayer concealability.

Since the inkjet recording method, the ink set, the ink cartridge, and the inkjet recording device according to this embodiment utilize the photocurable ink composition according to this embodiment, an image with excellent curability can be formed. Since the recorded article according to this embodiment is formed using the photocurable ink composition according to this embodiment, the recorded article exhibits excellent curability.

2. Second Embodiment

2.1. Photocurable ink composition

A photocurable ink composition according to a second embodiment is described below.

The photocurable ink composition according to this embodiment includes a polymerizable compound, a radical photopolymerization initiator, a chain transfer agent, a metallic pigment, and a hindered amine compound.

The photocurable ink composition according to this embodiment having the above configuration exhibits excellent storage stability and curability.

2.1.1. Polymerizable Compound

The photocurable ink composition according to this embodiment includes the polymerizable compound. The polymerizable compound used for the photocurable ink composition according to this embodiment is not particularly limited. A polymerizable compound including various polymerizable groups may be used. The polymerizable compound is classified as a radically polymerizable compound, a cationically polymerizable compound, or a radically and cationically polymerizable compound. Any of these polymerizable compounds can be suitably used for the photocurable ink composition according to this embodiment.

In this embodiment, the polymerizable compounds illustrated in "1.1.1. Polymerizable compound" in the first embodiment can be used irrespective of the presence or absence of the active hydrogen-containing functional group. Therefore, detailed description of the polymerizable compound according to this embodiment is omitted.

The content of the polymerizable compound in the photocurable ink composition according to this embodiment is preferably 10 to 90 mass %, and more preferably 25 to 75 mass %.

The curability of the photocurable ink composition according to this embodiment can be further improved by utilizing the polymerizable compound including the active hydrogen-containing functional group illustrated in the first embodiment.

2.1.2. Radical Photopolymerization Initiator

The radical photopolymerization initiator used for the photocurable ink composition according to this embodiment is the same as described in "1.1.2. Radical photopolymerization initiator" in the first embodiment. Therefore, detailed description of the radical photopolymerization initiator is omitted.

The content of the radical photopolymerization initiator in the photocurable ink composition according to this embodiment is preferably 1 to 20 mass %, and more preferably 2 to 10 mass % in the same manner as in the first embodiment.

2.1.3. Chain Transfer Agent

The photocurable ink composition according to this embodiment includes the chain transfer agent. The chain transfer agent includes an active hydrogen-containing functional group.

Specific examples of the chain transfer agent including the active hydrogen-containing functional group include 2,2'-(ethylenedioxy)diethylenethiol, pentaerythritol tetrakis(3-mercaptoacetate), pentaerythritol tetrakis(3-mercaptopropionate), 1,4-bis(3-mercaptobutyryloxy)butane ("Karenz MT-BD1" manufactured by Showa Denko K.K.), pentaerythritol tetrakis(3-mercaptobutyrate) ("Karenz MT-PE1" manufactured by Showa Denko K.K.), 1,3,5-tris(3-mercaptobutyloxyethyl)-1,3,5-triazine-2,4,6 (1H,3H,5H)-trione ("Karenz MT-NR1" manufactured by Showa Denko K.K.), and the like. Further examples include bromotrichloromethane ($BrCCl_3$), chloroform ($CHCl_3$), tetrabromomethane ($CBr_4$), 1-butanethiol ($CH_3(CH_2)_3SH$), butyl-3-mercaptopropionate ($HSCH_2CH_2CO_2(CH_2)_3CH_3$), 2,2'-(ethylenedioxy)diethanethiol ($HSCH_2CH_2OCH_2CH_2OCH_2CH_2SH$), ethanethiol ($C_2H_5SH$), 3-Mercaptopropionicacid ($HSCH_2CH_2CO_2H$), 4-methylbenzenethiol ($CH_3C_6H_4SH$), methyl-3-mercaptopropionate ($HSCH_2CH_2COOCH_3$), tert-nonylmercaptan ($(CH_3)_3CCH_2C(CH_3)_2CH_2SH$), pentaerythritoltetrakis(2-mercaptoacetate) ($C(HSCH_2CO_2CH_2)_4$), pentaerythritoltetrakis(3-mercaptopropionate) ($C(HSCH_2CH_2COOCH_2)_4$), 1-pentanethiol ($CH_3(CH_2)_4SH$), 4,4'-thiobisbenzenethiol ($S(C_6H_4SH)_2$), isooctyl-3-mercaptopropionate ($HS\text{—}CH_2CH_2COOC_8H_{17}$), 2,4-diphenyl-4-methyl-1-pentene ($C_6H_5C(CH_3)_2CH_2C(C_6H_5)\text{=}CH_2$), and the like.

As the chain transfer agent including the active hydrogen-containing functional group, the thiol compounds are preferable from the viewpoint of reactivity with the polymerizable compound. Among the thiol compounds, an alkanethiol, an alkylenedithiol, and a polyvalent thiol are preferable. It is particularly preferable to use a thiol compound having a long alkyl chain or a high molecular weight from the viewpoint of reducing odor.

A halogen compound may adversely affect the environment or cause a print medium to deteriorate due to corrosion or the like. Therefore, it is preferable to use the thiol compound.

A chain transfer agent other than the above-mentioned compounds may not cause an allyl compound to polymerize due to electron density.

The content of the chain transfer agent including the active hydrogen-containing functional group in the photocurable ink composition according to this embodiment is preferably 0.01 to 1.0 mass %, and more preferably 0.1 to 0.5 mass %.

2.1.4. Hindered Amine Compound

The hindered amine compound used for the photocurable ink composition according to this embodiment is the same as described in "1.1.3. Hindered amine compound" in the first embodiment. Therefore, detailed description of the hindered amine compound is omitted. The content of the hindered amine compound in the photocurable ink composition is preferably 0.01 to 1.0 mass %, and more preferably 0.05 to 0.5 mass % in the same manner as in the first embodiment.

2.1.5. Metallic Pigment

The metallic pigment used for the photocurable ink composition according to this embodiment is the same as described in "1.1.4. Metallic pigment" in the first embodiment. Therefore, detailed description of the metallic pigment is omitted. The content of the metallic pigment in the photocurable ink composition is preferably 0.5 to 3.0 mass in the same manner as in the first embodiment.

2.1.6. Other Components

2.1.6.1. Color Material

A coloring agent that may be normally used for an ink may be used for the photocurable ink composition according to this embodiment without specific limitations. The coloring agent that may be used for the photocurable ink composition according to this embodiment is the same as described in "1.1.5.1. Color material" in the first embodiment. Therefore, detailed description of the coloring agent is omitted.

2.1.6.2. Additive

Additives that may be added to the photocurable ink composition according to this embodiment are the same as described in "1.1.5.2. Additive" in the first embodiment. Therefore, detailed description thereof is omitted.

2.2. Preparation of Photocurable Ink Composition

A method of preparing the photocurable ink composition according to this embodiment is not particularly limited. For example, the components of the photocurable ink composition are sufficiently mixed and uniformly dissolved. The solution is filtered under pressure through a membrane filter having a pore diameter of 0.8 micrometers. The resulting solution is then degassed using a vacuum pump to prepare a photocurable ink composition.

2.3. Process of Curing Photocurable Ink Composition

The photocurable ink composition according to this embodiment may be cured by applying light. The process of curing the photocurable ink composition according to this embodiment is the same as that described in the first embodiment. Therefore, detailed description thereof is omitted.

2.4. Ink Set, Ink Cartridge, Recorded Article, and Inkjet Recording Method

The photocurable ink composition according to this embodiment may be applied to an ink set, an ink cartridge, and a recorded article using the photocurable ink composition, for example. The ink set, the ink cartridge, and the recorded article are the same as those described in the first embodiment, except that the photocurable ink composition according to this embodiment is used. Therefore, detailed description thereof is omitted. An inkjet recording method is the same as that described in the first embodiment, except that the photocurable ink composition according to this embodiment is used. Therefore, detailed description thereof is omitted.

2.5. Effects

The photocurable ink composition according to this embodiment includes the chain transfer agent including the active hydrogen-containing functional group and the hindered amine compound. Therefore, the polymerizable compound can be allowed to undergo a radical polymerization reaction by suppressing termination of a reaction due to oxygen inhibition while ensuring that the hindered amine compound exhibits its radical polymerization inhibition capability. Accordingly, the photocurable ink composition according to this embodiment exhibits excellent storage stability due to inhibition of a dark reaction, and exhibits excellent curing sensitivity, polymerization rate, and curability during photocuring. Since the photocurable ink composition according to this embodiment includes the above-described metallic pigment, the photocurable ink composition exhibits excellent storage stability and can form a metallic image with excellent curability and a concealing image with excellent underlayer concealability.

Since the inkjet recording method, the ink set, the ink cartridge, and the inkjet recording device according to this embodiment utilize the photocurable ink composition according to this embodiment, an image with excellent curability can be formed. Since the recorded article according to this embodiment is formed using the photocurable ink composition according to this embodiment, the recorded article exhibits excellent curability.

3. Third Embodiment 3.1. Photocurable Ink Composition

A photocurable ink composition according to this embodiment includes the following component in addition to the components of the photocurable ink composition according to the first embodiment or the second embodiment.

3.1.1. Cellulose Ester Resin

The photocurable ink composition according to this embodiment may include a cellulose ester resin. The cellulose ester resin that may be used in this embodiment is a cellulose acetate butyrate resin (hereinafter referred to as "CAB resin") having a butylation rate of 19 to 48%.

The cellulose ester resin may be used as a viscosity controller. Examples of the cellulose ester resin include cellulose acetate (CA), cellulose acetate propionate (CAP), cellulose acetate butyrate (CAB), cellulose propionate (CP), cellulose triacetate (CAT), and the like. However, when using a cellulose ester resin other than the CAB resin, an image having clear gloss cannot be formed (i.e., a mat image is formed).

It is preferable that the CAB resin have a butylation rate of 19 to 48%, and particularly preferably 35 to 39%. If the butylation rate of the CAB resin is less than 19%, the CAB resin may not be dissolved in an organic solvent. As a result, the CAB resin may not function as a viscosity controller. If the butylation rate of the CAB resin is more than 48%, the solubility of the CAB resin in an organic solvent increases to a large extent so that the desired viscosity may not be obtained.

The weight average molecular weight of the CAB resin is preferably 60,000 to 90,000, and more preferably 70,000 to 80,000. The desired viscosity may not be obtained when the weight average molecular weight of the CAB resin is outside the above range.

The CAB resin is preferably added to the photocurable ink composition in an amount of 0.5 to 10 mass %. The pigment can be advantageously fixed on a recording medium by adding the CAB resin in an amount within the above range.

3.1.2. Additive

The photocurable ink composition according to this embodiment may further include an antioxidant, a UV absorber, a surfactant, and the like.

Examples of the antioxidant include 2,3-butyl-4-oxyanisole (BHA), 2,6-di-t-butyl-p-cresol (BHT), and the like. The antioxidant is preferably added to the ink composition in an amount of 0.01 to 0.5 mass %.

Examples of the UV absorber include a benzophenone compound, a benzotriazole compound, and the like. The UV absorber is preferably added to the ink composition in an amount of 0.01 to 0.5 mass %.

As the surfactant, an anionic surfactant, a cationic surfactant, an ampholytic surfactant, or a nonionic surfactant may be used. The surfactant is preferably added to the ink composition in an amount of 0.1 to 4.0 mass %.

3.2. Properties of Ink Composition

The photocurable ink composition according to this embodiment preferably has a viscosity at 20° C. of 2 to 10 mPa·s, and more preferably 3 to 5 mPa·s. If the photocurable ink composition has a viscosity at 20° C. within the above range, an appropriate quantity of ink is discharged from a nozzle so that incorrect flight or scattering of the ink can be prevented.

The photocurable ink composition according to this embodiment preferably has a surface tension of 20 to 50 mN/m. If the surface tension of the photocurable ink composition is less than 20 mN/m, an ink may be spread over the surface of a head, or may bleed out from the head. As a result, the ink may not be appropriately discharged from the nozzle. If the surface tension of the photocurable ink composition is more than 50 mN/m, the ink composition may not be spread over a recording medium, whereby printing may be impaired.

3.3. Preparation of Photocurable Ink Composition

The photocurable ink composition according to this embodiment may be prepared using a known method. For example, the metallic pigment, a dispersant, and part of an organic solvent are mixed. The metallic pigment is dispersed using a ball mill, a bead mill, ultrasonic waves, a jet mill, or the like to prepare a pigment dispersion. The balance of the organic solvent, a binder resin, and other additives (e.g., viscosity controller or surfactant) are added to the pigment dispersion with stirring to obtain a photocurable ink composition.

3.4. Inkjet Recording Method

An inkjet recording method according to this embodiment includes discharging droplets of the above-described photocurable ink composition to a recording medium so that the droplets adhere to the recording medium, an image having metallic gloss being formed using the photocurable ink composition.

Since the inkjet recording method according to this embodiment utilizes the above-described photocurable ink composition including the metallic pigment, printing with excellent ink discharge stability can be achieved. Moreover, an image that exhibits excellent metallic gloss, ink curability, drying capability, and fixing capability can be formed.

The photocurable ink composition may be discharged using the method described in the first embodiment.

The recording medium is not particularly limited. For example, various recording media such as regular paper, inkjet paper (mat paper or glossy paper), glass, a plastic film (e.g., vinyl chloride), a film in which a substrate is coated with a plastic or a receiving layer, a metal, and a printed circuit board may be used. When the recording medium includes an ink-receiving layer, it is preferable to print an image on the recording medium without heating from the viewpoint of preventing thermal damage. When the recording medium does not include an ink-receiving layer or includes an organic solvent, it is preferable to print an image on the recording medium with heating from the viewpoint of increasing the drying rate and obtaining excellent gloss.

The recording medium may be heated by causing a heat source to come in contact with the recording medium, applying infrared rays or microwaves (electromagnetic waves having a maximum wavelength of about 2450 MHz) to the recording medium, or applying a hot blast to the recording medium, for example.

The recording medium may be heated before, during, or after printing. The recording medium may be heated throughout printing. The heating temperature is preferably 30 to 80° C., and more preferably 40 to 60° C., although the heating temperature varies depending on the type of the recording medium.

The photocurable ink composition is preferably discharged onto the recording medium in an amount of 0.1 to 100 mg/cm$^2$, and more preferably 1.0 to 50 mg/cm$^2$, from the viewpoint of metallic gloss, a smooth printing process, and cost.

The dry weight of the metallic pigment that forms an image on the recording medium is preferably 0.0001 to 3.0 mg/cm$^2$ from the viewpoint of metallic gloss, a smooth printing process, and cost. A metallic gloss surface with a higher degree of gloss can be formed by reducing the dry weight of the metallic pigment. Therefore, a semi-transparent mirror image can be formed on a transparent recording medium. If the dry weight of the metallic pigment is more than 3.0 mg/cm$^2$, metallic gloss is impaired so that a mat metallic gloss surface is obtained.

3.5. Process of Curing Photocurable Ink Composition

The photocurable ink composition according to this embodiment may be cured by applying light. The process of curing the photocurable ink composition according to this embodiment is the same as that described in the first embodiment. Therefore, detailed description thereof is omitted. The metallic pigment has relatively low optical transparency. However, since the photocurable ink composition according to this embodiment includes the hindered amine compound and active hydrogen in combination, as described in the first embodiment or the second embodiment, the photocurable ink composition can be cured sufficiently by the above-mentioned curing process.

3.6. Ink Set, Ink Cartridge, and Inkjet Recording Device

The photocurable ink composition according to this embodiment may be applied to an ink set, an ink cartridge, and an inkjet recording device, for example. The ink set, the ink cartridge, and the inkjet recording device are the same as those described in the first embodiment, except that the photocurable ink composition according to this embodiment is used. Therefore, detailed description thereof is omitted.

3.7. Recorded Article

The photocurable ink composition according to this embodiment may be applied to a recorded article, for example. Since the recorded article is obtained by the inkjet recording method using the photocurable ink composition that includes the metallic pigment in addition to the configuration of the first embodiment or the second embodiment, the recorded article has an excellent metallic gloss surface that is cured sufficiently. When the photocurable ink composition includes the metallic pigment in the form of plate-like particles, the recorded article has a more excellent metallic gloss surface with higher curability.

3.8. Effects

The photocurable ink composition according to this embodiment includes the metallic pigment, the compound including the active hydrogen-containing functional group, and the hindered amine compound. Therefore, during the photocuring process, the polymerizable compound undergoes a radical polymerization reaction even under weak light by being shaded by the metallic pigment. Accordingly, the photocurable ink composition according to this embodiment exhibits excellent storage stability due to inhibition of a dark reaction, and exhibits excellent curing sensitivity, polymerization rate, and curability. Since the photocurable ink composition according to this embodiment includes the above-described metallic pigment, the photocurable ink composition exhibits excellent storage stability and can form a metallic gloss image with excellent curability and a concealing image with excellent underlayer concealability.

Since the inkjet recording method, the ink set, the ink cartridge, and the inkjet recording device according to this embodiment utilize the photocurable ink composition according to this embodiment, an image with excellent curability can be formed. Since the recorded article according to this embodiment is formed using the photocurable ink composition according to this embodiment, the recorded article has a metallic gloss surface excellent curability.

4. Examples and Comparative Examples

The invention is described in detail below by way of examples and comparative examples, which should not be construed as limiting the invention. The composition, the amount of each component, and evaluation results of each example and each comparative example are shown in Table 1.

TABLE 1

| Content (mass %) | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Polymerizable compound (including active hydrogen-containing functional group) | N-Vinylformamide | 25.0 | 25.0 | 25.0 | — | — | — | — | — | — | — |
| | Ethylene glycol monoallyl ether | — | — | — | 71.1 | 70.6 | 70.1 | 69.6 | 69.9 | 69.4 | 70.6 |
| | U-15HA | — | — | 7.5 | 7.5 | 7.5 | 7.5 | 7.5 | 7.5 | 7.5 | 7.5 |
| Chain transfer agent | Karenz MT NR-1 | — | — | — | — | — | — | — | 0.2 | 0.2 | — |
| Hindered amine compound | Irgastab UV-10 | 0.2 | 0.2 | 0.2 | 0.2 | 0.2 | 0.2 | 0.2 | 0.2 | 0.2 | 0.2 |
| Radical photo-polymerization initiator | Irgacure 819 | 4.0 | 4.0 | 4.0 | 6.4 | 6.4 | 6.4 | 6.4 | 6.4 | 6.4 | 6.4 |
| | Irgacure 127 | 1.0 | 1.0 | 1.0 | 1.6 | 1.6 | 1.6 | 1.6 | 1.6 | 1.6 | 1.6 |
| Metallic pigment | Color material: metallic pigment | 1.0 | 1.0 | 1.0 | 0.5 | 1.0 | 1.5 | 2.0 | 1.5 | 2.0 | 10. |
| | Thickness of metallic pigment (nm) | 20 | 20 | 20 | 20 | 20 | 20 | 20 | 20 | 20 | 200 |
| Polymerizable compound (without active hydrogen-containing functional group) | Tripropylene glycol diacrylate | 68.6 | 48.6 | 61.1 | — | — | — | — | — | — | — |
| | Ethylene glycol dimethacrylate | — | — | — | — | — | — | — | — | — | — |
| | Viscoat #1000 | — | 20.0 | — | 12.5 | 12.5 | 12.5 | 12.5 | 12.5 | 12.5 | 12. |
| Other component | Surfactant: BYK-UV3500 | 0.2 | 0.2 | 0.2 | 0.2 | 0.2 | 0.2 | 0.2 | 0.2 | 0.2 | 0.2 |
| Evaluation result | Storage stability (60° C.-5 d) | 10%> | 10%> | 10%> | 10%> | 10%> | 10%> | 10%> | 10%> | 10%> | 10%> |
| | Storage stability | OK | OK | OK | OK | OK | OK | OK | OK | OK | OK |
| | Curability | AA | AA | AA | AA | AA | AA | A | AA | A | B |
| | Print stability | AA | AA | AA | AA | AA | AA | A | A | A | A |
| | Metallic gloss | OK | OK | OK | OK | OK | OK | OK | OK | OK | OK |

| Content (mass %) | | Example 11 | Example 12 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Polymerizable compound (including active hydrogen-containing functional group) | N-Vinylformamide | — | 25.0 | — | — | 25.0 | 25.0 | 25.0 | 25.0 | — |
| | Ethylene glycol monoallyl ether | 70.6 | — | — | 70.6 | — | — | — | — | — |
| | U-15HA | 7.5 | — | — | 7.5 | — | — | — | — | — |
| Chain transfer agent | Karenz MT NR-1 | 0.2 | — | — | 0.2 | — | — | 0.2 | — | 0.2 |
| Hindered amine compound | Irgastab UV-10 | 0.2 | 0.2 | 0.2 | — | 0.2 | 0.2 | 0.2 | 0.2 | 0.2 |
| Radical photo-polymerization initiator | Irgacure 819 | 6.4 | 4.0 | 4.0 | 6.4 | — | — | — | 4.0 | 6.4 |
| | Irgacure 127 | 1.6 | 1.0 | 1.0 | 1.6 | — | — | — | 1.0 | 1.6- |
| Metallic pigment | Color material: metallic pigment | 1.0 | 1.0 | 1.0 | 1.0 | 1.0 | 1.0 | 1.0 | — | — |
| | Thickness of metallic pigment (nm) | 200 | Sphere | 20 | 20 | 20 | 20 | 20 | — | — |
| Polymerizable compound (without active hydrogen-containing functional group) | Tripropylene glycol diacrylate | — | 68.6 | 93.6 | — | 73.6 | 53.6 | 53.4 | 49.6 | — |
| | Ethylene glycol dimethacrylate | — | — | — | — | — | — | — | — | 71.4 |
| | Viscoat #1000 | 12.5 | — | — | 12.5 | — | 20.0 | 20.0 | 20.0 | 20.0 |
| Other component | Surfactant: BYK-UV3500 | 0.2 | 0.2 | 0.2 | 0.2 | 0.2 | 0.2 | 0.2 | — | — |
| Evaluation result | Storage stability (60° C.-5 d) | 10%> | 10%> | 10%> | Gelled | 10%> | 10%> | 10%> | 10%> | 10%> |
| | Storage stability | OK | OK | OK | NG | OK | OK | OK | OK | OK |
| | Curability | B | B | C | — | C | C | C | AA | AA |
| | Print stability | A | C | B | C | C | C | C | A | A |
| | Metallic gloss | OK | OK | — | — | — | — | — | NG | NG |

The details of each component shown in Table 1 are as follows.

U-15HA (manufactured by Shin-Nakamura Chemical Co., Ltd.): urethane oligomer (including an active hydrogen-containing functional group)

Irgastab UV-10 (manufactured by Ciba Specialty Chemicals): hindered amine compound (HALS) including a 2,2,6,6-tetramethylpiperidine group Irgacure 819 and Irgacure 127 (manufactured by Ciba Specialty Chemicals): radical photopolymerization initiator Karenz MT-NR1 (manufactured by Showa Denko K.K. Ltd.): thiol compound including an active hydrogen-containing functional group Viscoat #1000 (manufactured by Osaka Organic Chemical Industry Ltd.): dendritic polymer that does not include an active hydrogen-containing functional group, but includes a (meth)acryloyl group BYK-UV3500 (manufactured by BYK Japan KK): surfactant In Table 1, N-vinylformamide, U-15HA, and ethylene glycol monoallyl ether are polymerizable compounds including an active hydrogen-containing functional group.

4.1. Preparation of Ink Composition 4.1.1. Preparation of Metallic Pigment Liquid Dispersion A resin coating liquid containing 3 mass % of a cellulose acetate butyrate (CAB) resin (butylation rate: 35 to 39%, manufactured by Kanto Chemical Co., Inc.) and 97 mass % of diethylene glycol diethyl ether (manufactured by Nippon Nyukazai Co., Ltd.) was uniformly applied to a PET film having a thickness of 100 micrometers by bar coating, and was dried at 60° C. for 10 minutes to form a resin layer thin film on the PET film.

An aluminum deposited layer having an average thickness of 20 nm was formed on the resin layer thin film using a vacuum deposition device ("VE-1010" manufactured by Vacuum Device Inc.). The ultraviolet transmittance at this thickness was 8% at a wavelength of 365 nm and 0.8% at a wavelength of 395 nm.

Table 2 shows the light transmittance when changing the thickness of the laminate of plate-like metal particles to 200 nm or 20000 nm.

TABLE 2

| Thickness of aluminum deposited layer | Quantity of light (wavelength: 365 nm) (microW/cm$^2$) | Transmittance (%) | Quantity of light (wavelength: 395 nm) (microW/cm$^2$) | Transmittance (%) |
|---|---|---|---|---|
| No deposited layer | 330 | — | 55,500 | — |
| 20 nm | 26.5 | 8.0 | 450 | 0.8 |
| 200 nm | 0.8 | 0.2 | 238 | 0.4 |
| 20,000 nm | 0.0 | 0.0 | 0.0 | 0.0 |

The laminate formed by the above method was immersed in ethylene glycol monoallyl ether, and the aluminum deposited layer was removed from the PET film using an ultrasonic disperser ("VS-150" manufactured by AS ONE Corporation). The aluminum deposited layer was ground and dispersed in the solvent. The ultrasonic dispersion treatment was performed for 12 hours to prepare a metallic pigment liquid dispersion.

The resulting metallic pigment liquid dispersion was filtered through an SS mesh filter with a pore size of 5 micrometers to remove large particles. After placing the filtrate in a round bottom flask, excess ethylene glycol monoallyl ether was evaporated using a rotary evaporator. The metallic pigment liquid dispersion was thus concentrated. The concentration of the metallic pigment was determined using a thermal analyzer ("EXSTAR-6000TG/DTA" manufactured by SII NanoTechnology Inc.). The concentration of the metallic pigment was then adjusted to obtain a 5 mass % metallic pigment liquid dispersion.

The circle-equivalent 50% average particle diameter R50 of the metallic pigment (thickness: 20 nm) in the X(major axis)-Y(minor axis) plane was measured using a particle diameter/particle size distribution measurement device ("FPIA-3000S" manufactured by Sysmex Corporation). The ratio R50/Z was calculated based on the measured values R50 and Z (thickness). The circle-equivalent 50% average particle diameter R50 of the metallic pigment (thickness: 20 nm) was 1.03 micrometers, and the ratio R50/Z was 51.5.

4.1.2. Preparation of Ink Composition

Photocurable ink compositions respectively having the compositions of Examples 1 to 12 and Comparative Examples 1 to 5 shown in Table 1 were prepared using the metallic pigment liquid dispersion prepared by the above method. Specifically, each component shown in Table 1 other than the metallic pigment was mixed and dissolved. After the addition of the metallic pigment liquid dispersion prepared by the above method, the mixture was stirred using a magnetic stirrer for 120 minutes at room temperature and normal pressure. The mixture was then filtered through an SS mesh filter to obtain photocurable ink compositions of Examples 1 to 12 and Comparative Examples 1 to 5 according to the compositions shown in Table 1. The metallic pigment having a thickness of 20 nm was used for the ink compositions of Examples 1 to 9 and Comparative Examples 1 to 6, and the metallic pigment having a thickness of 200 nm was used for the ink compositions of Example 10 and Comparative Example 11. Approximately spherical aluminum particles contained in a commercially available aluminum paste ("WXM0650" manufactured by Toyo Aluminium K.K., average particle diameter: 6 micrometers) were used the ink composition of Example 12 as the metallic pigment. In Table 1, the thickness of the metallic pigment of Example 12 is indicated as "Sphere". The mesh size of the SS mesh filter was 5 micrometers in Examples 1 to 11 and was 10 micrometers in Example 12.

4.1.3. Preparation of Colorless Transparent Ink (Clear Ink) Composition According to Comparative Example The ink compositions of Comparative Examples 6 and 7 shown in Table 1 did not contain a metallic pigment. Each component in an amount shown in Table 1 was mixed and completely dissolved. The solution was then mixed with stirring at room temperature for 30 minutes. The mixture was then filtered through a membrane filter with a pore size of 5 micrometers to obtain colorless ink compositions of Comparative Examples 6 and 7.

4.2. Evaluation Test 4.2.1. Storage Stability Test

The storage stability was evaluated as follows. Specifically, the viscosity of each ink composition was measured. The ink composition was hermetically enclosed in an opaque container, and stored at 60° C. for five days in a shaded thermostat bath. The viscosity of each ink composition was then measured. A change in viscosity was calculated by the following expression.

[(viscosity after storage at 60° C. for five days−initial viscosity)/(initial viscosity)]×100(%)

The values obtained for each example and each comparative example are shown in Table 1.

In Table 1, "Gelled" indicates that the ink composition was gelled or solidified after storage so that the viscosity could not be measured.

When the change in viscosity was more than +10% or the ink composition was gelled or solidified after storage so that the viscosity could not be measured, the storage stability was evaluated as bad ("NG" in Table 1). When the change in viscosity was +10% or less, the storage stability was evaluated as bad ("OK" in Table 1). "10%>" in Table 1 indicates that the change in viscosity was +10% or less.

The viscosity was measured using a rheometer "MCR-300" (manufactured by Nihon SiberHegner K.K.).

4.2.2. Curability Test

A curability test was conducted using the ink composition of which the storage stability was evaluated as good ("OK").

A photo black cartridge of an inkjet printer ("PM-G920" manufactured by Seiko Epson Corporation) was charged with the ink composition of each of Examples 1 to 12, Comparative Example 1, and Comparative Examples 3 to 7. A solid image was printed at room temperature and normal pressure so that the maximum thickness of the ink composition in the print image was 5 micrometers. As the recording medium, an OHP film (A4) ("XEROXFILM (no frame)" manufactured by Fuji Xerox Co., Ltd.) was used. Ultraviolet rays were applied to the recording medium so that the cumulative quantity of light was 3000 mJ/cm$^2$ from an ultraviolet light source at a dose of 120 mW/cm$^2$ to cure the ink composition. The surface of the resulting printed article was rubbed with a fingernail at a constant force, and the presence or absence of scratches was observed with the naked eye. In Table 1, a case where no surface scratches were observed is indicated by "AA", a case where slight surface scratches were observed is indicated by "A", a case where surface scratches were observed, but tackiness was not observed is indicated by "B", and a case where tackiness was observed is indicated by "C".

4.2.3. Print Stability

Images were successively printed using each ink composition utilizing the above inkjet printer to evaluate the print stability. The print stability was evaluated according to the following criteria.

AA: When images were printed on 1000 sheets of A4 paper per day, images could be printed on 3000 sheets of paper (three days) without problems. A: When images were printed on 1000 sheets of A4 paper per day, defective printing occurred, but could be adjusted by normal cleaning so that images could be printed on 3000 sheets of paper (three days). B: When images were printed on 1000 sheets of A4 paper per day, the head was clogged on the first day so that printing could not be performed. C: Images could not be printed on 1000 sheets of A4 paper per day.

4.2.4. Evaluation of Metallic Tone

The metallic impression of the printed article of which the curability test result was "AA" or "A" was evaluated with the naked eye. A case where the printed article had metallic gloss or mat metallic gloss was evaluated as good ("OK"), and a case where the printed article did not have metallic gloss was evaluated as bad ("NG").

4.3. Evaluation Results

As shown in Table 1, the photocurable ink compositions of Examples 1 to 11 contained the polymerizable compound including an active hydrogen-containing functional group, the hindered amine compound, the radical photopolymerization initiator, and the metallic pigment. These photocurable ink compositions exhibited excellent storage stability, curability, and print stability, and produced metallic gloss. The photocurable ink composition of Example 12 (reference example) contained the polymerizable compound including an active hydrogen-containing functional group, the hindered amine compound, the radical photopolymerization initiator, and the metallic pigment. The photocurable ink composition of Example 12 exhibited inferior print stability, but exhibited excellent storage stability and curability and produced metallic gloss. The solid image printed using the photocurable ink composition of each example was observed with the naked eye. The solid image had metallic gloss with excellent underlayer concealability.

The ink composition of Comparative Example 1 did not contain a polymerizable compound including an active hydrogen-containing functional group and a chain transfer agent including an active hydrogen-containing functional group. The ink composition of Comparative Example 1 exhibited insufficient curability. The ink composition of Comparative Example 2 did not contain a hindered amine compound. The ink composition of Comparative Example 2 exhibited insufficient storage stability and print stability. The ink compositions of Comparative Examples 3 to 5 did not contain a radical photopolymerization initiator. These ink compositions exhibited insufficient curability and print stability.

The ink compositions of Comparative Examples 6 and 7 did not contain a metallic pigment. These ink compositions exhibited excellent storage stability, curability, and print stability, but the resulting printed article did not have metallic gloss.

The invention is not limited to the above-described embodiments, and various modifications can be made. For example, the invention includes various other configurations substantially the same as the configurations described in the embodiments (in function, method and result, or in objective and result, for example). The invention also includes a configuration in which an unsubstantial portion in the described embodiments is replaced. The invention also includes a configuration having the same effects as the configurations described in the embodiments, or a configuration able to achieve the same objective. Further, the invention includes a configuration in which a publicly known technique is added to the configurations in the embodiments.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A photocurable ink composition comprising:
   at least one compound that is selected from a group consisting of N-vinylformamide, a urethane oligomer, ethylene glycol monoallyl ether, diethylene glycol monoallyl ether, trimethylolpropane diallyl ether, trimethylolpropane monoallyl ether, glycerol monoallyl ether, allyl glycidyl ether, pentaerythritol triallyl ether, hydroxybutyl vinyl ether, 2-hydroxyethyl methacrylate, 2-hydroxypropyl acrylate and 4-hydroxybutyl acrylate;
   a radical photopolymerization initiator;
   a hindered amine compound; and
   a metallic pigment,
   the metallic pigment being aluminum or an aluminum alloy;
   the metallic pigment being plate-like particles wherein metallic pigment has a light transmittance at 395 nm in the thickest direction of 0.8% or more.

2. A photocurable ink composition comprising:
a polymerizable compound;
a radical photopolymerization initiator;
at least one compound that is selected from a group consisting of alkanethiol, alkylenedithiol, and polyvalent thiol;
a hindered amine compound; and
a metallic pigment,
the metallic pigment being aluminum or an aluminum alloy;
the metallic pigment being plate-like particles; and
the metallic pigment being plate-like particles wherein metallic pigment has a light transmittance at 395 nm in the thickest direction of 0.8% or more.

3. The photocurable ink composition as defined in claim 2, comprising:
at least one compound that is selected from a group consisting of N-vinylformamide, a urethane oligomer, ethylene glycol monoallyl ether, diethylene glycol monoallyl ether, trimethylolpropane diallyl ether, trimethylolpropane monoallyl ether, glycerol monoallyl ether, allyl glycidyl ether, pentaerythritol triallyl ether, hydroxybutyl vinyl ether, 2-hydroxyethyl methacrylate, 2-hydroxypropyl acrylate and 4-hydroxybutyl acrylate as the polymerizable compound.

4. The photocurable ink composition as defined in claim 2, comprising:
a compound including an acrylic group or a methacrylic group as the polymerizable compound.

5. The photocurable ink composition as defined in claim 1, the hindered amine compound having a 2,2,6,6-tetramethylpiperidine structure.

6. The photocurable ink composition as defined in claim 2, the hindered amine compound having a 2,2,6,6-tetramethylpiperidine structure.

7. The photocurable ink composition as defined in claim 1, the metallic pigment being prepared by pulverizing a metal deposited film.

8. The photocurable ink composition as defined in claim 2, the metallic pigment being prepared by pulverizing a metal deposited film.

9. The photocurable ink composition as defined in claim 1,
when a major axis, a minor axis, and a thickness of each of the plate-like particles in a plane are respectively referred to as X, Y, and Z, a circle-equivalent 50% average particle diameter of each of the plate-like particles being determined based on the X-Y plane area and in a range from 0.5 to 3 micrometers.

10. The photocurable ink composition as defined in claim 2,
when a major axis, a minor axis, and a thickness of each of the plate-like particles in a plane are respectively referred to as X, Y, and Z, a circle-equivalent 50% average particle diameter of each of the plate-like particles being determined based on the X-Y plane area and in a range from 0.5 to 3 micrometers.

11. An inkjet recording method of discharging droplets of an ink composition to a recording medium so that the droplets adhere to the recording medium, the method comprising:
generating an image having metallic gloss by using the photocurable ink composition as defined in claim 1.

12. An inkjet recording method of discharging droplets of an ink composition to a recording medium so that the droplets adhere to the recording medium, the method comprising:
generating an image having metallic gloss by using the photocurable ink composition as defined in claim 2.

* * * * *